(12) United States Patent
Warashina et al.

(10) Patent No.: US 9,557,555 B2
(45) Date of Patent: Jan. 31, 2017

(54) OPTICAL MODULE AND PRODUCTION METHOD FOR SAME

(75) Inventors: Yoshihisa Warashina, Hamamatsu (JP); Tomofumi Suzuki, Hamamatsu (JP); Kohei Kasamori, Hamamatsu (JP)

(73) Assignee: HAMAMATSU PHOTONICS K.K., Hamamatsu-shi (JP)

( * ) Notice: Subject to any disclaimer, the term of this patent is extended or adjusted under 35 U.S.C. 154(b) by 0 days.

(21) Appl. No.: 14/117,396

(22) PCT Filed: Apr. 4, 2012

(86) PCT No.: PCT/JP2012/059226
§ 371 (c)(1),
(2), (4) Date: Nov. 13, 2013

(87) PCT Pub. No.: WO2012/157357
PCT Pub. Date: Nov. 22, 2012

(65) Prior Publication Data
US 2014/0139924 A1    May 22, 2014

(30) Foreign Application Priority Data
May 16, 2011    (JP) .................. 2011-109686

(51) Int. Cl.
*G02B 26/00*    (2006.01)
*G02B 26/08*    (2006.01)
(Continued)

(52) U.S. Cl.
CPC .......... *G02B 26/001* (2013.01); *G01B 9/02051* (2013.01); *G01B 9/02056* (2013.01);
(Continued)

(58) Field of Classification Search
CPC . G02B 26/00; G02B 26/001; G02B 26/29395; G02B 26/29358; G02B 1/10; G02B 1/11; G02B 1/113; G02B 1/115; G01J 3/26
(Continued)

(56) References Cited

U.S. PATENT DOCUMENTS 6,932,271 B2    8/2005    Nakajima et al.
2007/0008607 A1*    1/2007    Miles .......................... 359/291
(Continued)

FOREIGN PATENT DOCUMENTS

CN    1782762    6/2006
CN    101786592    7/2010
(Continued)

*Primary Examiner* — Scott J Sugarman
*Assistant Examiner* — Kristina Deherrera
(74) *Attorney, Agent, or Firm* — Drinker Biddle & Reath LLP

(57) ABSTRACT

An optical module includes a first plate-shaped member having a light transmissive optical component which is formed by applying etching to a silicon region, and a second plate-shaped member having light reflective optical components (mirrors) for reflecting light transmitting through the light transmissive optical component. The first and second plate-shaped members are bonded to one another, and an optical path for light transmitting through the light transmissive optical component is along a component forming surface of the first plate-shaped member and a principal surface of the second plate-shaped member. Thereby, realizing an optical module in which it is possible to dispose the light reflective optical component and the light transmissive optical component close to one another, and a manufacturing method for the optical module.

9 Claims, 25 Drawing Sheets

(51) Int. Cl.
  *G01B 9/02* (2006.01)
  *G02B 5/08* (2006.01)
  *G01J 3/453* (2006.01)
(52) U.S. Cl.
  CPC ........... *G01J 3/4535* (2013.01); *G01J 3/4537* (2013.01); *G02B 5/08* (2013.01); *G02B 26/0833* (2013.01)
(58) Field of Classification Search
  USPC .......... 359/577–590, 196.1–226.3, 887–888; 356/450–521
  See application file for complete search history.

(56) References Cited

U.S. PATENT DOCUMENTS

| | | | |
|---|---|---|---|
| 2008/0080034 A1* | 4/2008 | Saadany et al. | 359/223 |
| 2010/0315647 A1 | 12/2010 | Saadany et al. | |
| 2011/0080572 A1* | 4/2011 | Kelkar | 355/71 |

FOREIGN PATENT DOCUMENTS

| | | |
|---|---|---|
| CN | 101788688 | 7/2010 |
| CN | 101938087 | 1/2011 |
| CN | 101981488 | 2/2011 |
| EP | 1 906 159 | 4/2008 |
| JP | 2001-033604 | 2/2001 |
| JP | 2006-084635 A | 3/2006 |
| JP | 2008-102132 A | 5/2008 |
| JP | 2010-170029 A | 8/2010 |
| JP | 2012-242450 | 12/2012 |

\* cited by examiner

*Fig.8*
(a)
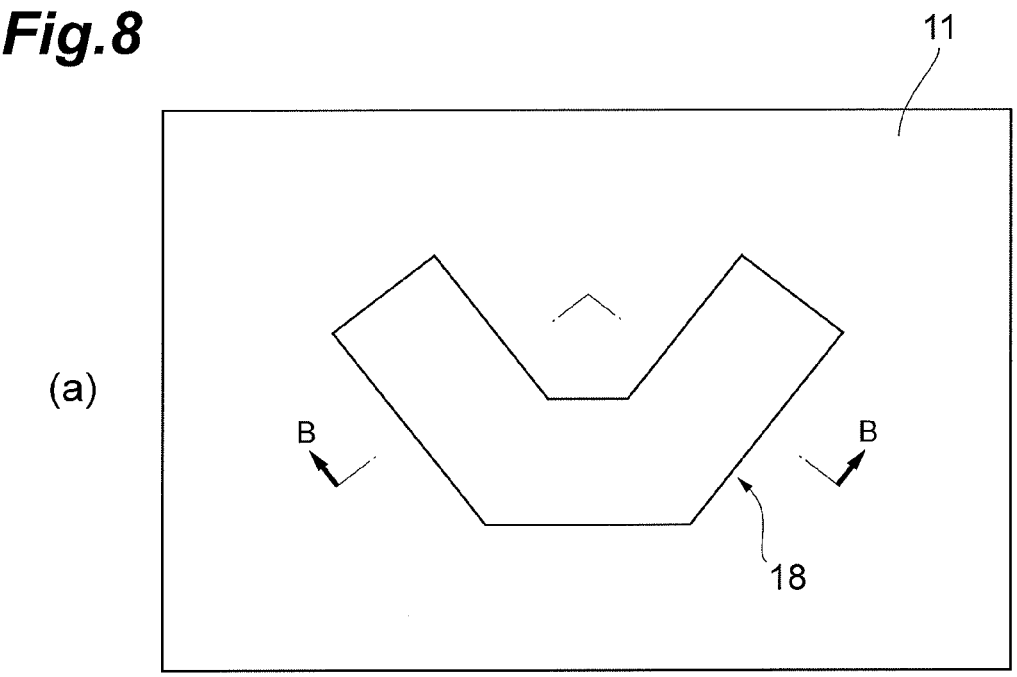
(b)
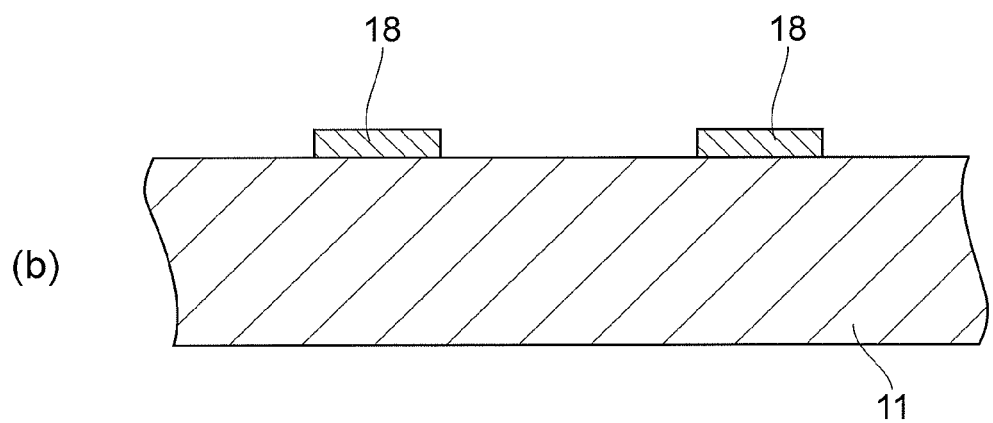

Fig.9
(a)
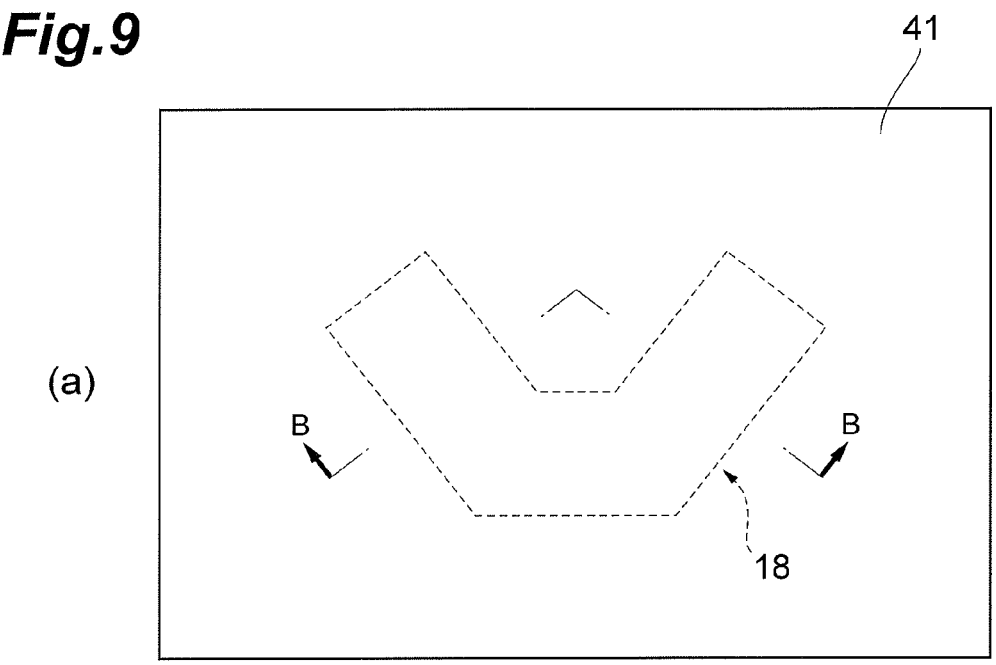
(b)
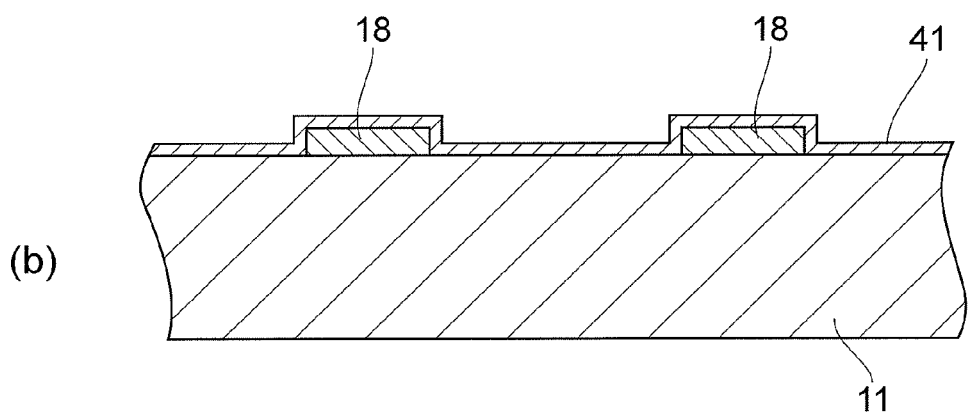

Fig.10
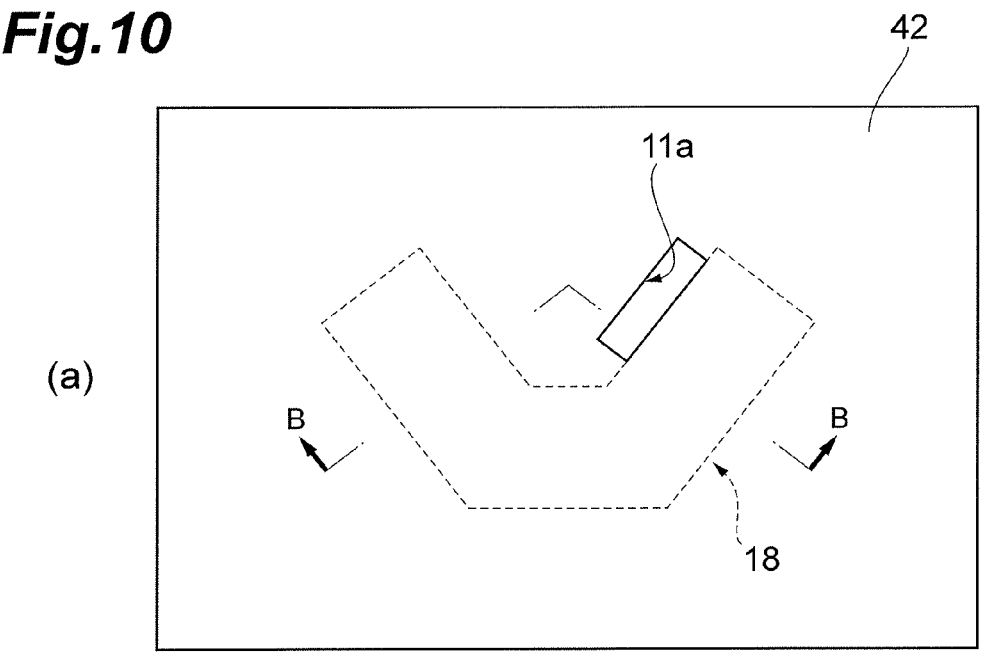
(a)
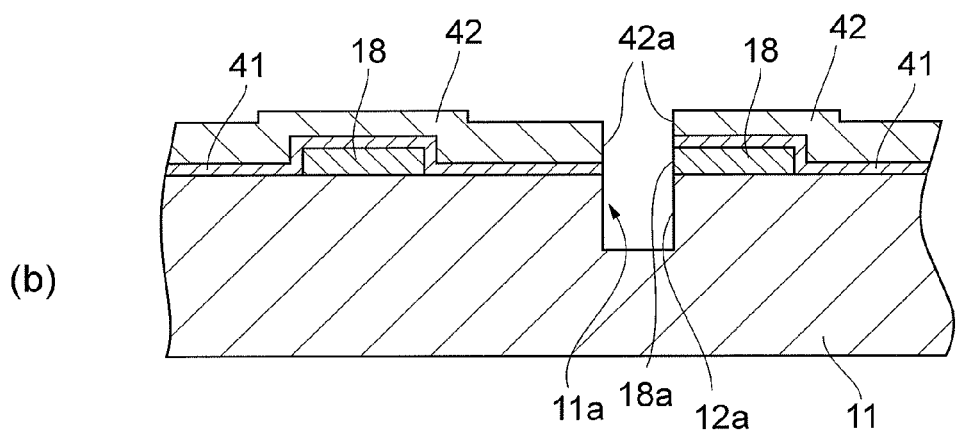
(b)

Fig.11
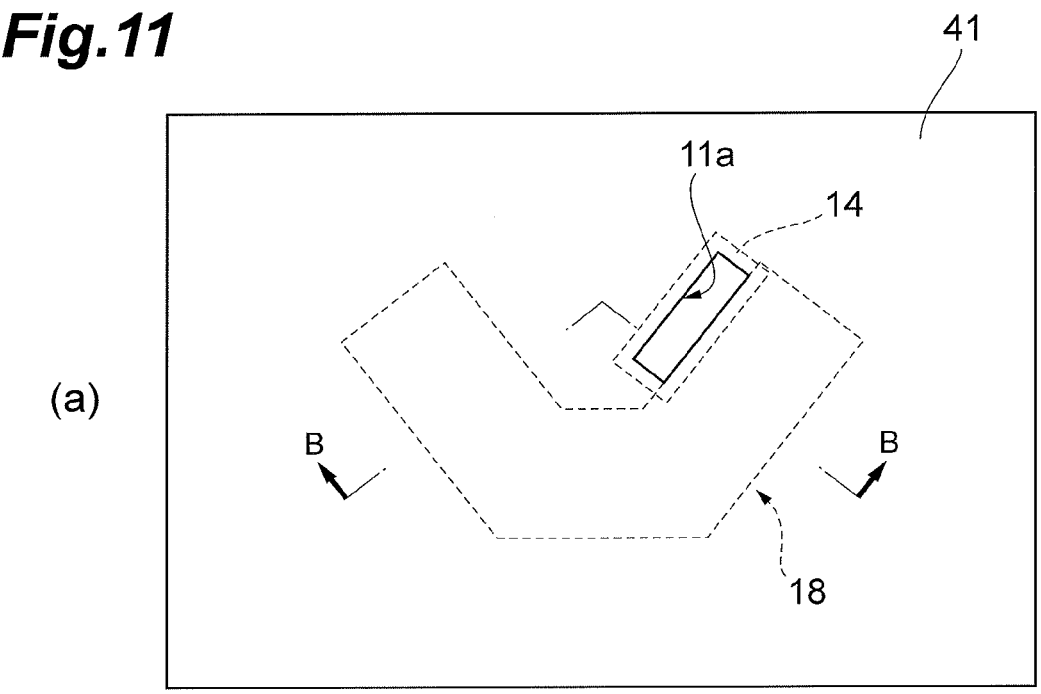
(a)
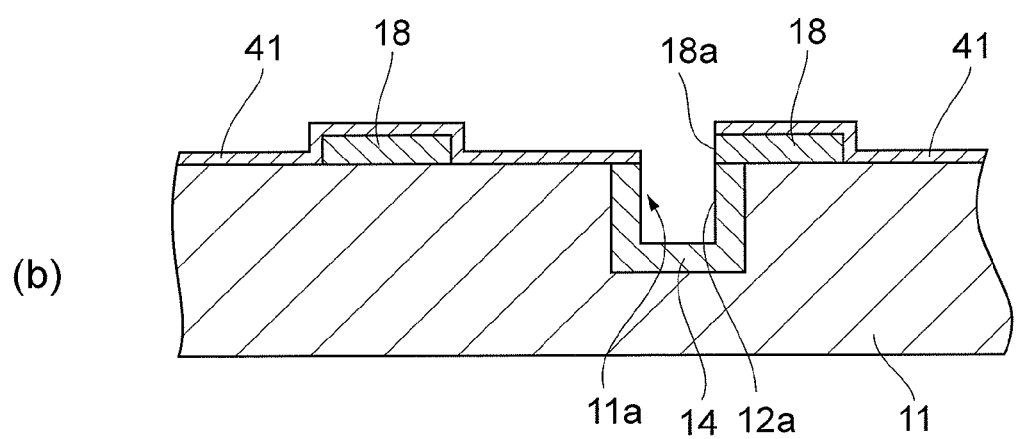
(b)

Fig.12
(a)
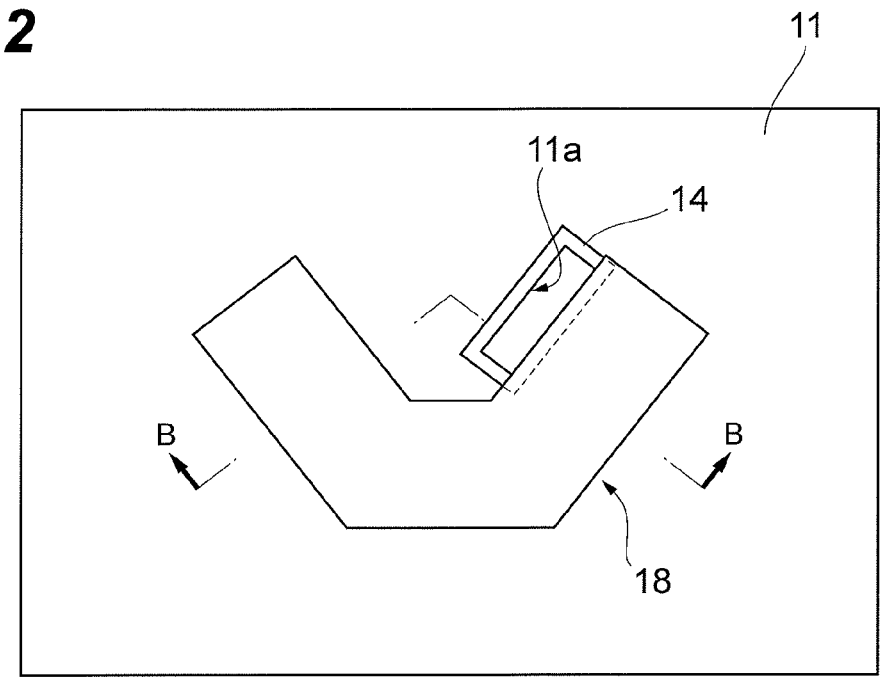
(b)
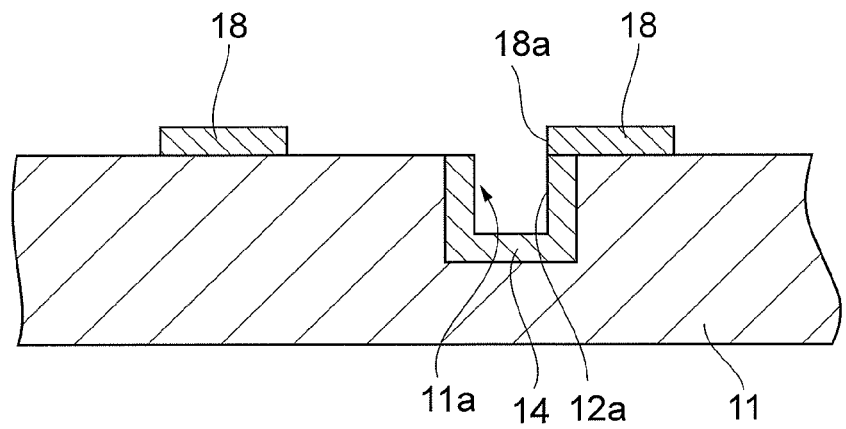

Fig.13
(a)
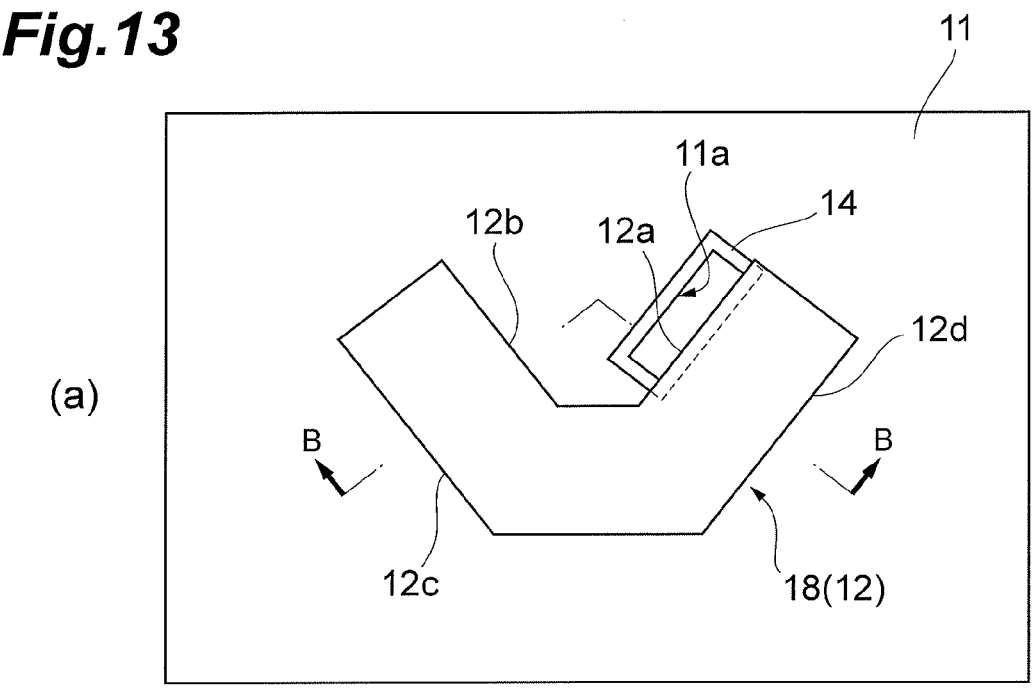
(b)
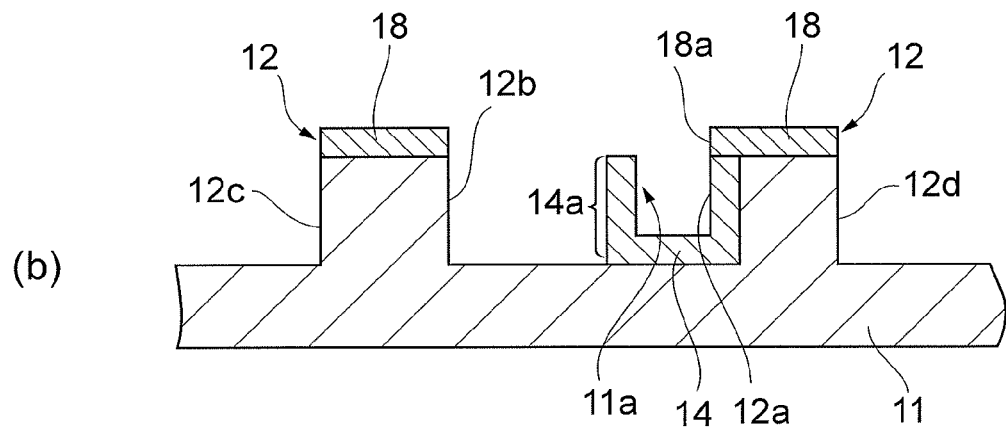

Fig.14
(a)
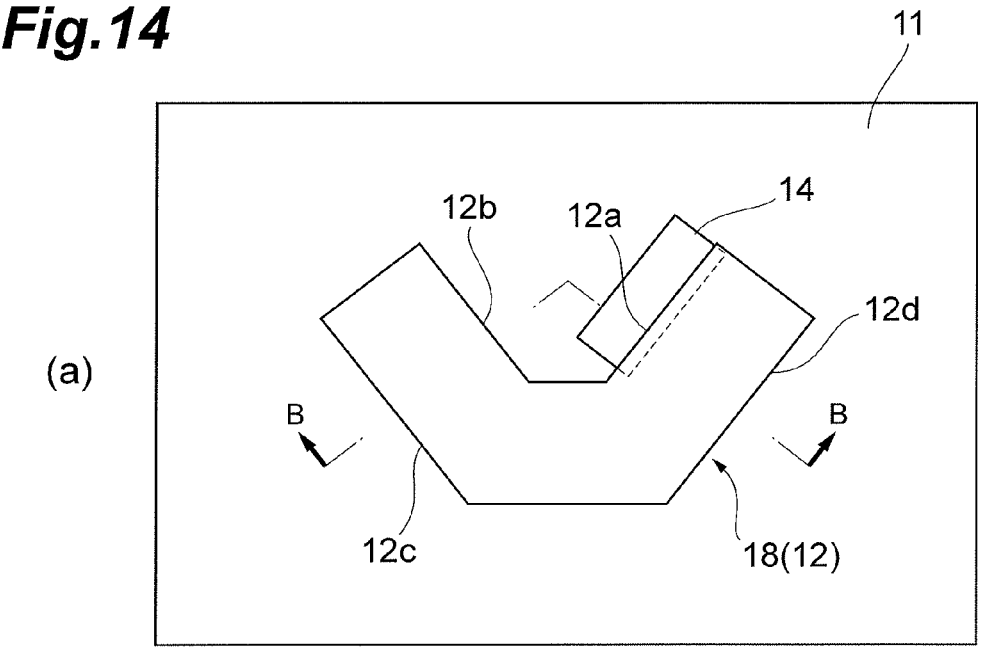
(b)
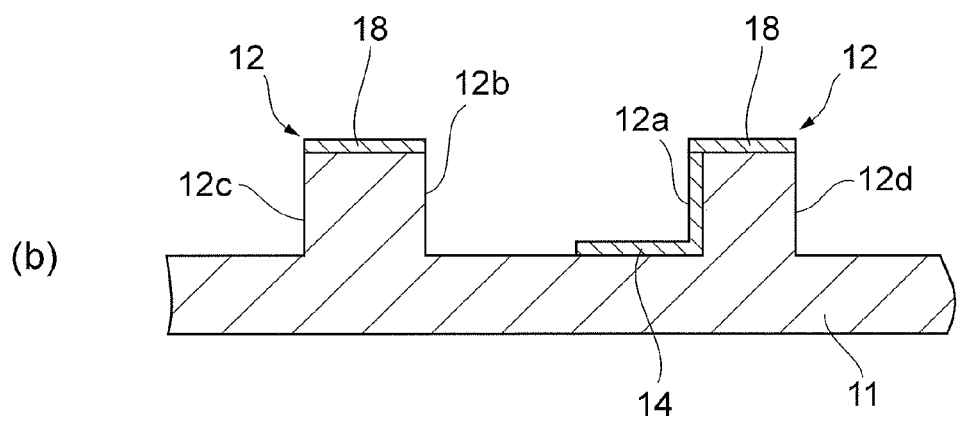

Fig.15
(a) 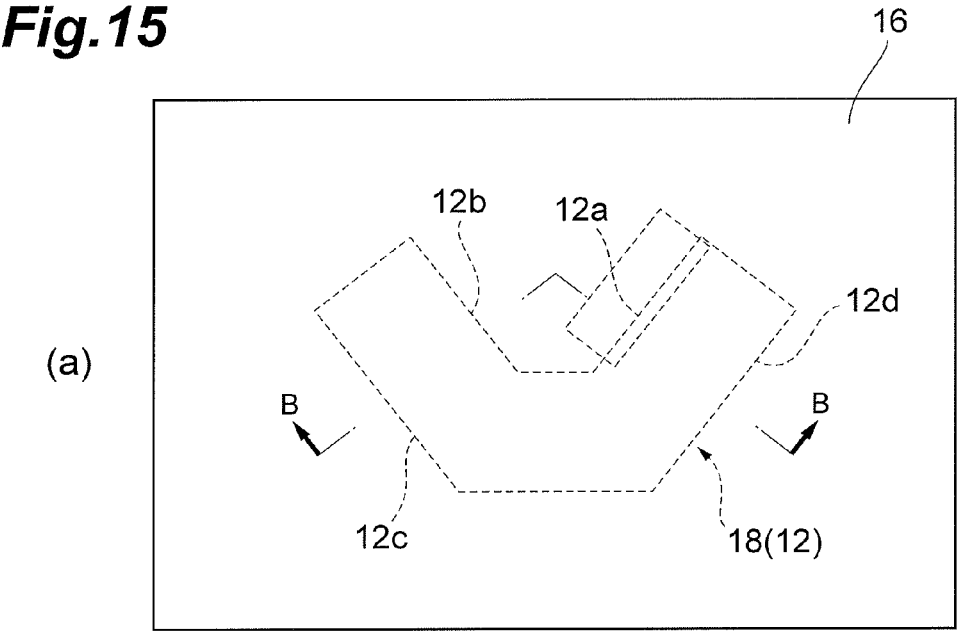
(b) 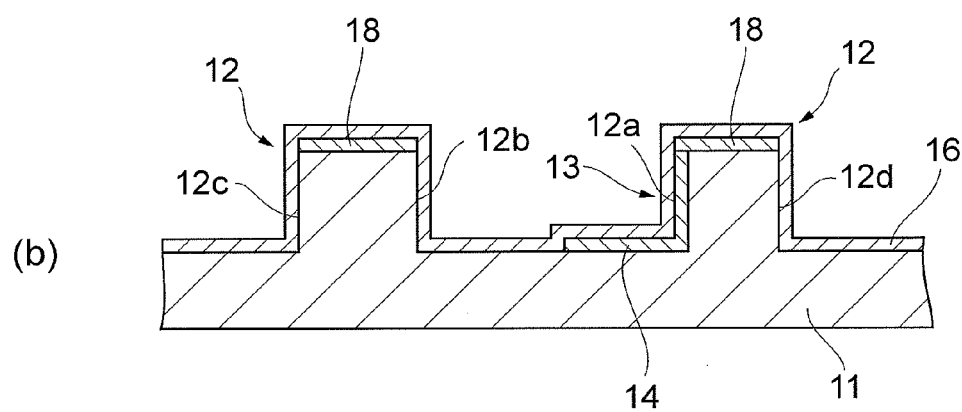

Fig.21
(a)
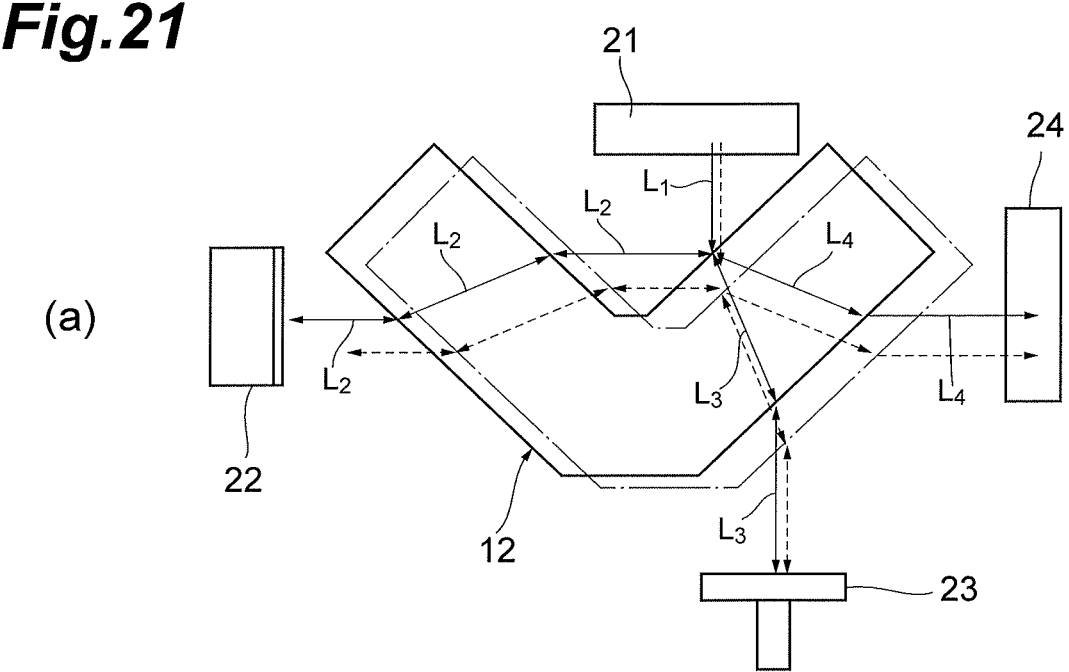
(b)
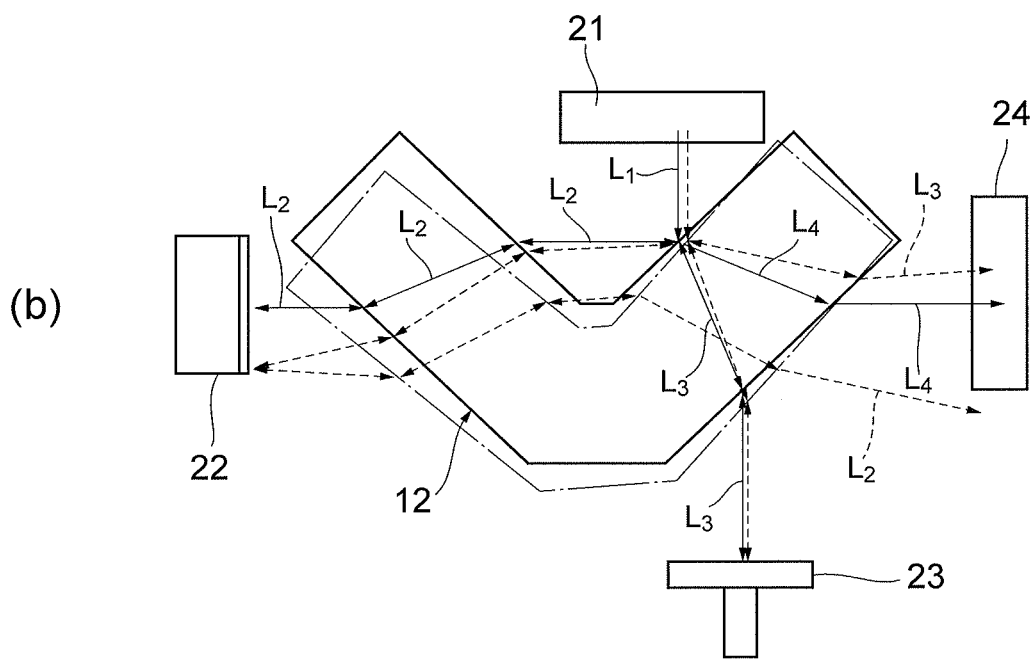

OPTICAL MODULE AND PRODUCTION METHOD FOR SAME

TECHNICAL FIELD

The present invention relates to an optical module and a manufacturing method for the same.

BACKGROUND ART

In Patent Documents 1 and 2, there is disclosed an optical module in which an interference optical system is configured on an SOI (Silicon On Insulator) substrate by use of a MEMS technology. These interference optical systems include a beam splitter, a movable mirror attached to an electrostatic actuator, and a fixed mirror, and these are formed by applying etching to a silicon layer and an insulating layer of an SOI substrate into arbitrary shapes.

CITATION LIST

Patent Literature

Patent Document 1: Japanese Patent Application Laid-Open No. 2008-102132
Patent Document 2: Japanese Patent Application Laid-Open No. 2010-170029

SUMMARY OF INVENTION

Technical Problem

An optical system prepared by applying etching to a substrate is, as the interference optical systems described in Patent Document 1 and Patent Document 2 for example, composed of various types of optical components such as an electrostatic actuator, a mirror surface, and a beam splitter. In order to form a light reflective optical component such as a mirror surface among these optical components, it is recommended that a metal film for light reflection be deposited on a surface formed by applying etching to a substrate, via a shadow mask. Further, at the time of forming a light transmissive optical component such as a beam splitter, it is preferable to form a semi-transmissive reflection film or an antireflection film on a surface formed by applying etching to a substrate.

However, at the time of depositing a metal film, the metal is likely to spread around to adhere to the light reflective optical component. In particular, in the case where a metal film is deposited on a surface perpendicular to the board surface of a substrate, it is necessary to supply metallic particles from the direction inclined to the normal direction of the board surface of the substrate, and such a trend becomes prominent. Accordingly, because it is necessary to dispose a light transmissive optical component so as to be separated at a region separated so as to prevent the metal from adhering thereto, an optical path between the light reflective optical component and the light transmissive optical component is made longer, and a beam diameter excessively spreads to partially come off of these optical components, which might lead to a lowering in light use efficiency.

Further, at the time of preparing a conductive component such as an electrostatic actuator, it is preferable to use a substrate containing a dopant at a predetermined concentration in order to obtain the conductive property of the component. On the other hand, in a light transmissive optical component such as a beam splitter, in order to inhibit absorption of light, it is preferable that the impurities contained in a substrate are less. In this way, in some cases, requirements for the characteristics of the substrates may be contradictory depending on the types of the optical components. However, when various types of optical components are formed by use of one substrate as described in Patent Document 1 or Patent Document 2, it is difficult to satisfy such conflicting requirements at one time.

The present invention has been made in view of the above-described problem, and an object thereof is to provide an optical module in which it is possible to dispose a light reflective optical component such as a mirror surface, and a light transmissive optical component such as a beam splitter close to one another, and it is possible to satisfy the requirements even in the case where the requirements for the characteristics of the substrate are contradictory depending on the optical components, and a manufacturing method for the optical module.

Solution to Problem

In order to solve the above-described problems, there is provided an optical module according to the present invention that includes a first plate-shaped member having a light transmissive optical component which is formed by applying etching to a silicon region, and a second plate-shaped member having a light reflective optical component for reflecting light transmitting through the light transmissive optical component, on its principal surface, and the first and second plate-shaped members are bonded to one another such that a component forming surface of the first plate-shaped member on which the light transmissive optical component is formed and the principal surface of the second plate-shaped member face one another, and an optical path for light transmitting through the light transmissive optical component is along the component forming surface of the first plate-shaped member and the principal surface of the second plate-shaped member.

In this optical module, the light transmissive optical component and the light reflective optical component are respectively formed on the separate plate-shaped members (first and second plate-shaped members). Accordingly, at the time of forming these optical components on the respective plate-shaped members, it is possible to match the characteristics of the substrates such as an impurity concentration to the characteristics most suitable for the respective optical components. As one example, impurities are not added to the first plate-shaped member on which the light transmissive optical component is formed, to inhibit absorption of light, and appropriate amounts of impurities are added to the second plate-shaped member on which the light reflective optical component is formed, to secure favorable conductive property, which makes it possible to form a conductive component such as an electrostatic actuator that drives the light reflective optical component. Further, because it is possible separately to form the light transmissive optical component and the light reflective optical component on the respective plate-shaped members, the processing for one of the optical components such as deposition of a metal film does not have an effect on the other optical component. Accordingly, it is possible to dispose the light reflective optical component and the light transmissive optical component close to one another, which makes it possible to improve the light use efficiency.

A first manufacturing method for an optical module according to the present invention includes forming a plurality of alignment marks for alignment of first and second plate-shaped members respectively on a peripheral portion of the first plate-shaped member having a light transmissive optical component formed by applying etching to a silicon region, and a peripheral portion of the second plate-shaped member having a light reflective optical component for reflecting light transmitting through the light transmissive optical component, on its principal surface, and bonding the peripheral portions of the first and second plate-shaped members to one another such that a component forming surface of the first plate-shaped member on which the light transmissive optical component is formed and the principal surface of the second plate-shaped member face one another, by use of the plurality of alignment marks.

A second manufacturing method for an optical module according to the present invention includes forming a plurality of alignment marks for alignment of first and second wafers respectively on a peripheral portion of the first wafer including a plurality of regions which respectively have light transmissive optical components formed by applying etching to a silicon region, and a peripheral portion of the second wafer including a plurality of regions which have light reflective optical components for reflecting light transmitting through the light transmissive optical components, on its principal surface, and bonding the first and second wafers to one another such that a component forming surface of the first wafer on which the light transmissive optical components are formed and the principal surface of the second wafer face one another, by use of the plurality of alignment marks.

In accordance with the first and second manufacturing methods for the optical modules, because the plurality of alignment marks are formed on the peripheral portions of the plate-shaped members and the wafers, and the first and second wafers are bonded by use of these alignment marks, it is possible to reduce a relative angle deviation between the first plate-shaped member and the second plate-shaped member, which makes it possible to inhibit a lowering of the light use efficiency. In particular, in accordance with the second manufacturing method for the optical module, because the plurality of alignment marks are formed on the peripheral portions of the wafers including the plurality of regions corresponding to the optical modules, it is possible to make the distance between the alignment marks very long, which makes it possible to prominently reduce a relative angle deviation.

Advantageous Effects of Invention

In accordance with the optical module and the manufacturing method for the optical module of the present invention, it is possible to dispose a light reflective optical component such as a mirror surface and a light transmissive optical component such as a beam splitter close to one another, and it is possible to satisfy the requirements even in the case where the requirements for the characteristics of the substrate are contradictory depending on the optical components.

BRIEF DESCRIPTION OF DRAWINGS

FIG. 8 includes diagrams showing a mask formation process in a manufacturing method for the first plate-shaped member.
FIG. 9 includes diagrams showing a mask formation process in the manufacturing method for the first plate-shaped member.
FIG. 10 includes diagrams showing a first etching process in the manufacturing method for the first plate-shaped member.
FIG. 11 includes diagrams showing a thermal oxidation process in the manufacturing method for the first plate-shaped member.
FIG. 12 includes diagrams showing a nitride film removal in the thermal oxidation process in the manufacturing method for the first plate-shaped member.
FIG. 13 includes diagrams showing a second etching process in the manufacturing method for the first plate-shaped member.
FIG. 14 includes diagrams showing a third etching process in the manufacturing method for the first plate-shaped member.
FIG. 15 includes diagrams showing a nitride film formation process in the manufacturing method for the first plate-shaped member.
FIG. 21 includes diagrams for explanation of problems caused by a positional deviation between the first plate-shaped member and the second plate-shaped member.

DESCRIPTION OF EMBODIMENTS

Hereinafter, an embodiment of an optical module and a manufacturing method for the optical module according to the present invention will be described in detail with reference to the accompanying drawings. In the description of the drawings, the same components are denoted by the same reference symbols, and overlapping descriptions will be omitted.

Figure 1:
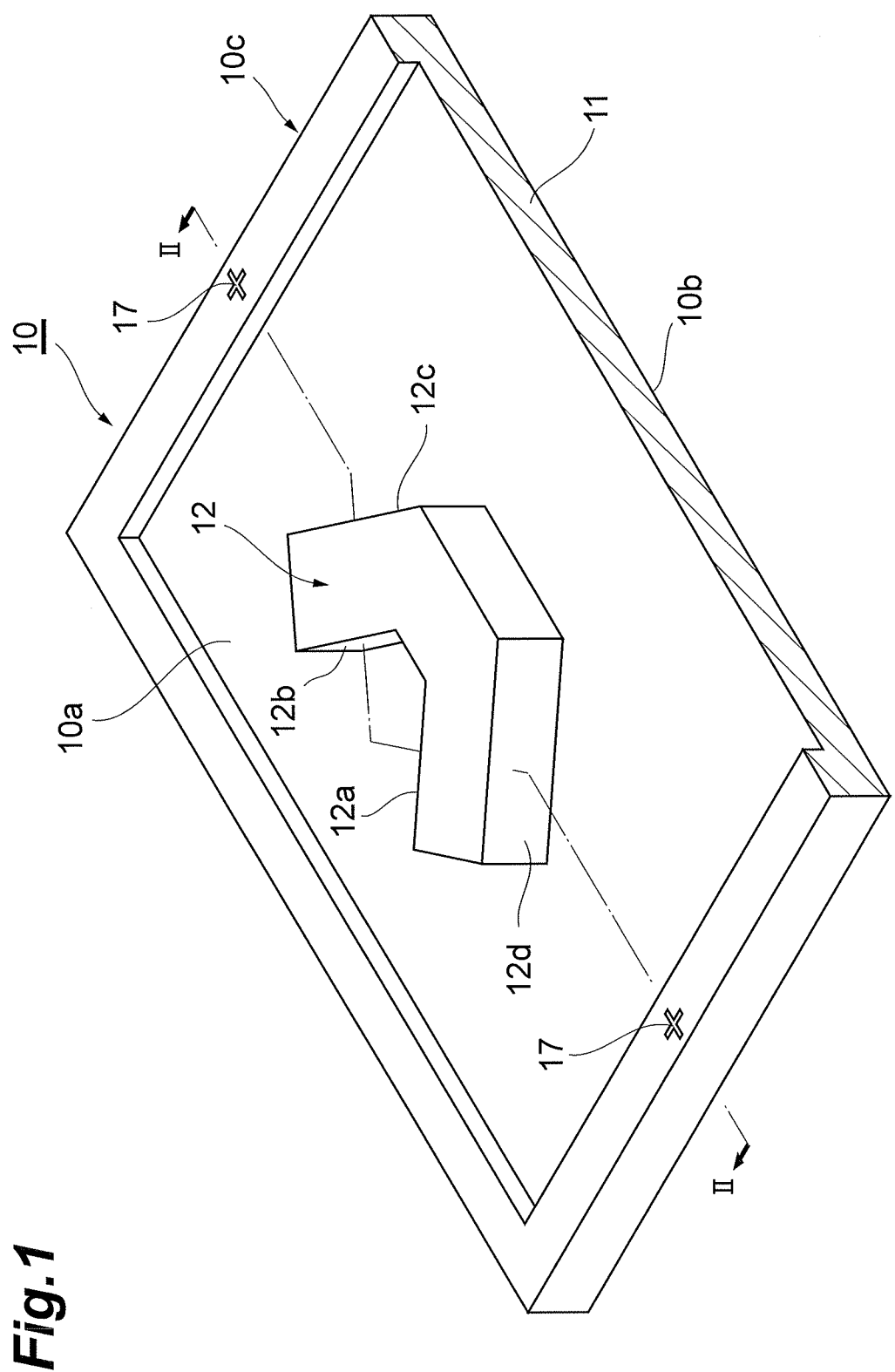
FIG. 1 is a perspective view showing an appearance of a first plate-shaped member.
Figure 2:
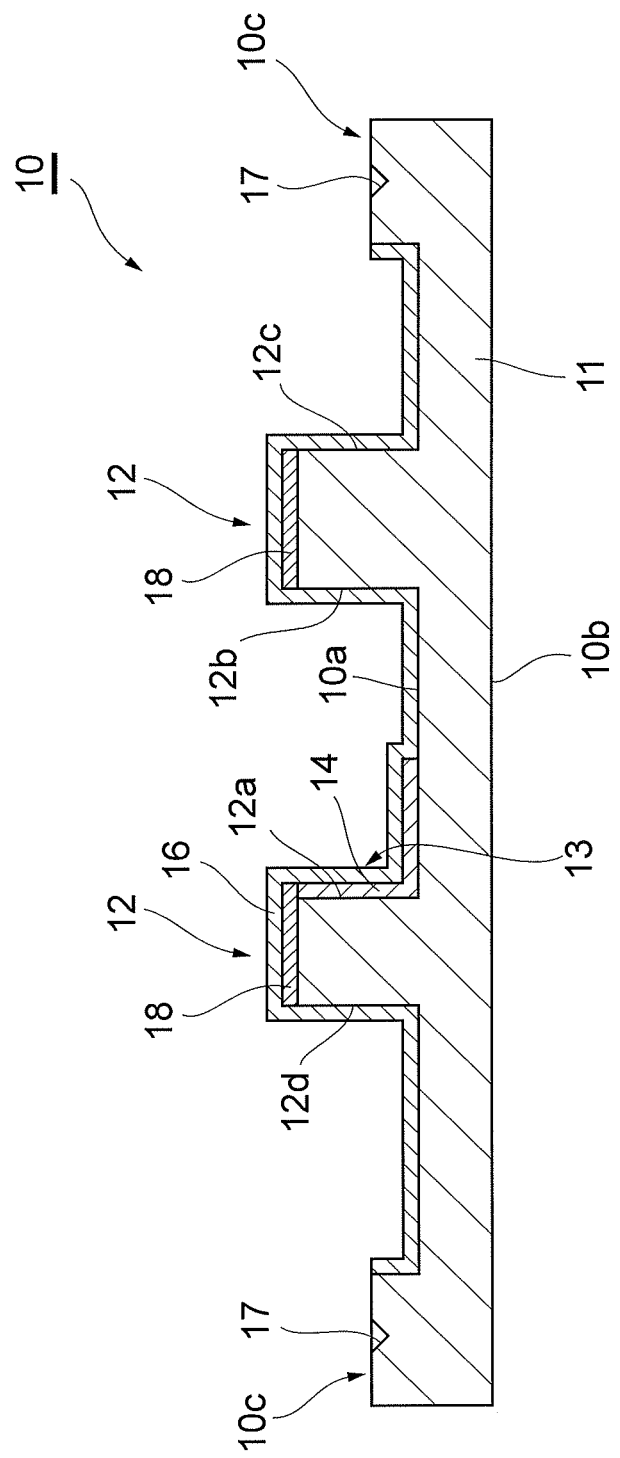
FIG. 2 is a diagram showing the cross-section taken along the line of II-II shown in FIG. 1.

An optical module according to the present embodiment is configured by two plate-shaped members (first and second plate-shaped members) which are joined together, and has a Michelson interference optical system built-in. FIG. 1 and FIG. 2 are diagrams showing a first plate-shaped member 10. FIG. 1 is a perspective view showing an appearance of the first plate-shaped member 10, and FIG. 2 is a diagram showing the cross-section taken along the line of II-II shown in FIG. 1. The first plate-shaped member 10 is a member prepared by applying etching to a silicon substrate, and is composed mainly of silicon. The first plate-shaped member 10 has a component forming surface 10a and a rear surface 10b on the opposite side of the component forming surface 10a.

As shown in FIG. 1, a light transmissive optical component 12 is formed on the side of the component forming surface 10a of the first plate-shaped member 10. The light transmissive optical component 12 is an optical component formed by applying etching to a silicon region 11 composing a silicon substrate, and allows light at a predetermined wavelength to transmit through it. The light transmissive optical component 12 of the present embodiment has a substantially V-shaped planar shape, and has four side surfaces 12a to 12d optically functioning. The side surface 12a is a semi-transmissive reflecting surface (half mirror), and has a reflectance of, for example, 30% to 50% for light in a range of wavelengths to be used. This semi-transmissive reflecting surface functions as a beam splitter in the Michelson interference optical system. The side surfaces 12b to 12d are light transmitting surfaces, and have transmittances of, for example, 90% to 99% for light in a range of wavelengths to be used.

As shown in FIG. 2, the side surface 12a of the light transmissive optical component 12 is covered with a semi-transmissive reflection film 13 formed of a silicon oxide film 14 formed on the side surface of the silicon region 11, and a silicon nitride film 16 formed on the silicon oxide film 14. The wavelength-reflection characteristics of the side surface 12a vary according to the respective thicknesses of the silicon oxide film 14 and the silicon nitride film 16. Further, the side surfaces 12b to 12d of the light transmissive optical component 12 is covered with an antireflection film (AR film) composed of the silicon nitride film 16 formed on the side surfaces of the silicon region 11. The wavelength-reflection characteristics of the side surfaces 12b to 12d vary according to the thickness of the silicon nitride film 16. In addition, the silicon oxide film 14 is formed from the side surface 12a of the light transmissive optical component 12 up to the area on the silicon region 11 around the light transmissive optical component 12, and is formed by thermally-oxidizing the silicon region 11 as will be described later. Further, the silicon nitride film 16 is formed over the entire surface on the silicon region 11 including the area on the silicon oxide film 14, and the areas on the side surfaces 12b to 12d of the light transmissive optical component 12. A silicon oxide film 18 is interposed between the upper surface of the light transmissive optical component 12 and the silicon nitride film 16. The silicon oxide film 18 is an etching mask used at the time of forming the light transmissive optical component 12 by applying etching to the silicon region 11.

A peripheral portion 10c of the first plate-shaped member 10 slightly projects in its thickness direction with respect to the component forming surface 10a, to surround the light transmissive optical component 12. A plurality of (two in the present embodiment) alignment marks 17 for alignment with a second plate-shaped member which will be described later are formed on the peripheral portion 10c. In one example, the one alignment mark 17 is formed on the peripheral portion 10c in one side of the first plate-shaped member 10, and the other alignment mark 17 is formed on the peripheral portion 10c in the other side (preferably, the side facing the one side) of the first plate-shaped member 10. These alignment marks 17 have an arbitrary planar shape of, for example, a cross shape, and is composed of trenches formed in the peripheral portion 10c in the present embodiment.

Figure 3:
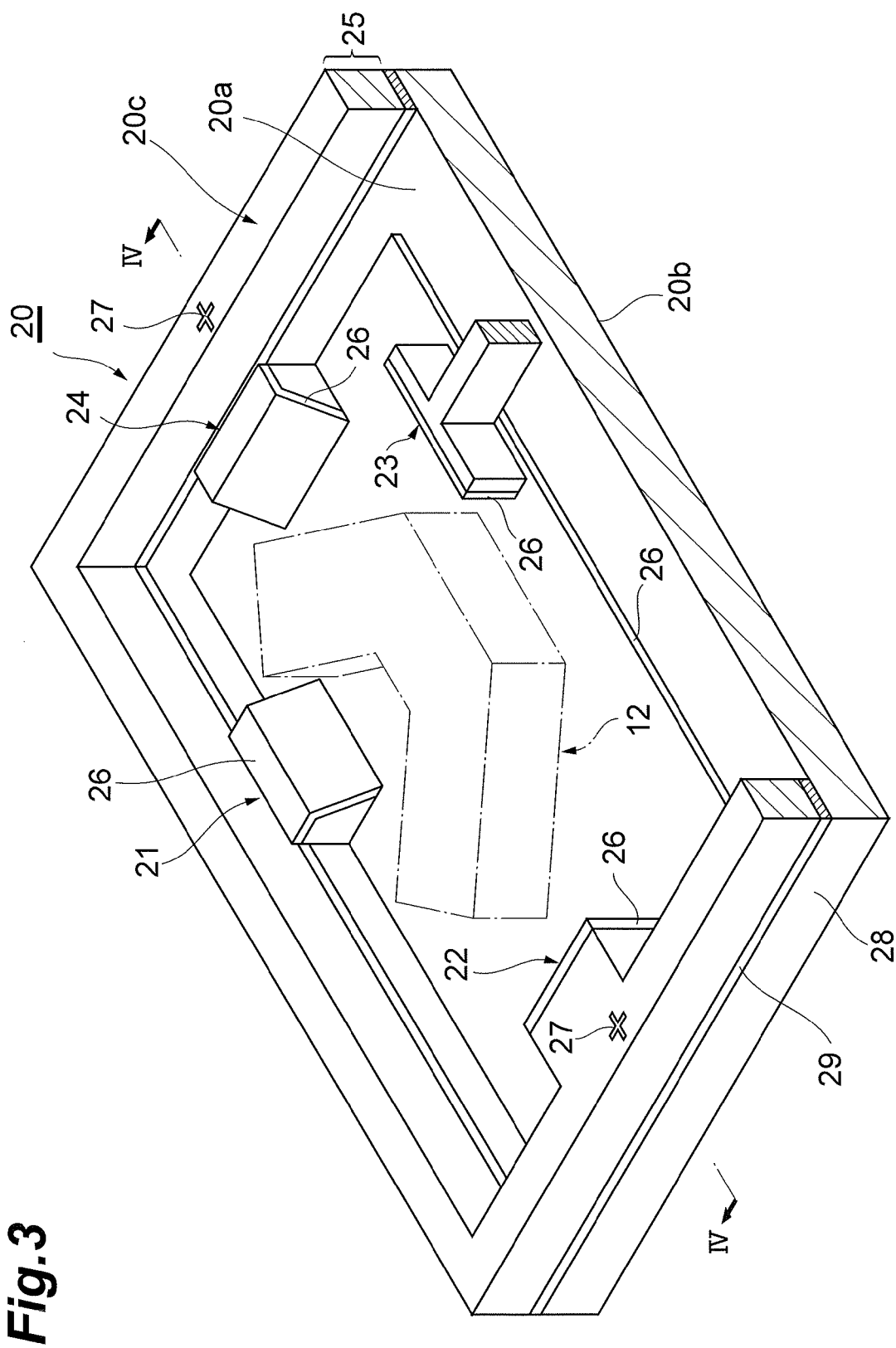
FIG. 3 is a perspective view showing an appearance of a second plate-shaped member.
Figure 4:
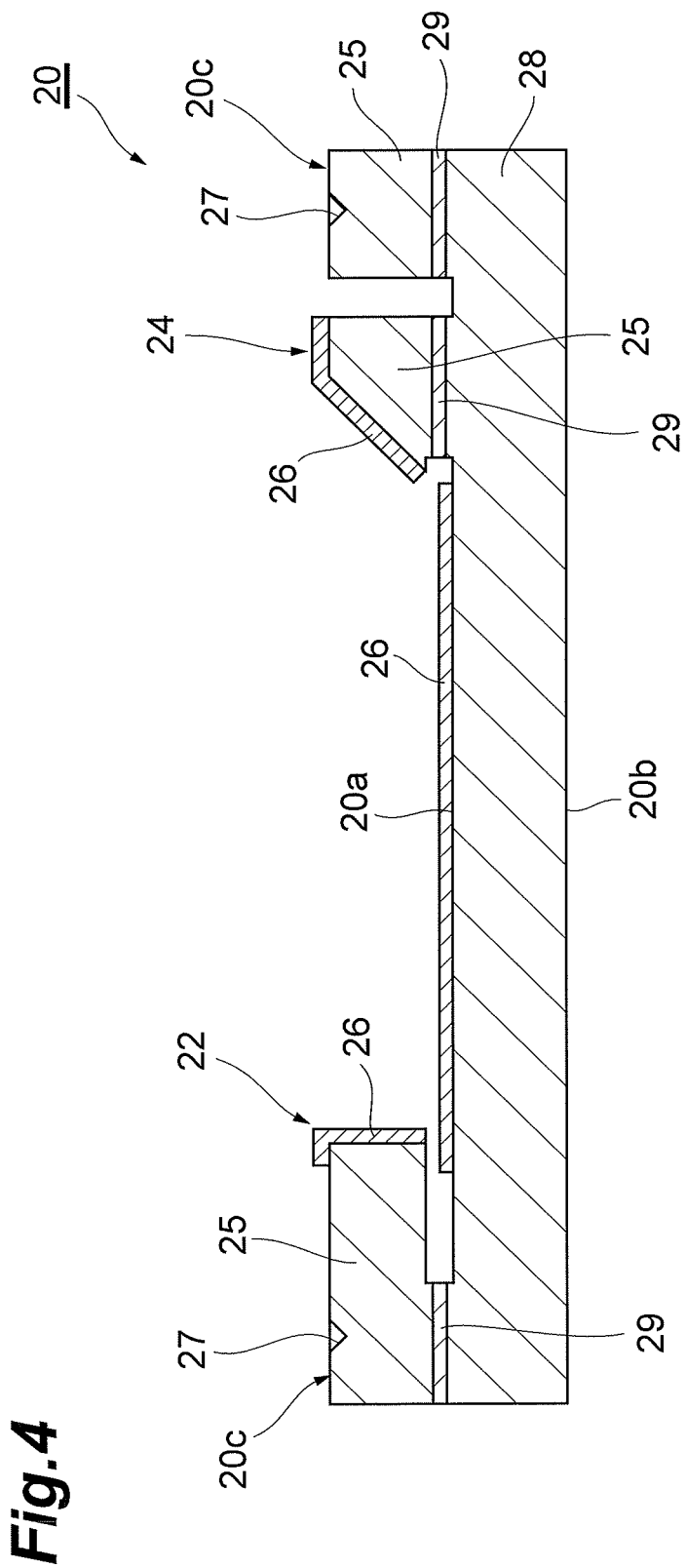
FIG. 4 is a diagram showing the cross-section taken along the line of IV-IV shown in FIG. 3.

FIG. 3 and FIG. 4 are diagrams showing a second plate-shaped member 20. FIG. 3 is a perspective view showing an appearance of the second plate-shaped member 20, and FIG. 4 is a diagram showing the cross-section taken along the line of Iv-Iv shown in FIG. 3. In addition, in FIG. 3, the position and the range of the light transmissive optical component 12 in a state in which the first plate-shaped member 10 and the second plate-shaped member 20 are bonded to one another are shown by the dashed-dotted line.

The second plate-shaped member 20 is a member prepared by applying etching to a silicon layer 25 of a so-called silicon on insulator (SOI) substrate in which an insulating layer 29 and the silicon layer 25 are laminated on a support substrate 28. The second plate-shaped member 20 has a principal surface 20a on which the support substrate 28 is exposed, and a rear surface 20b on the opposite side of the principal surface 20a. As shown in FIG. 3, an incident mirror 21, a fixed reflecting mirror 22, a movable reflecting mirror 23, and an exit mirror 24 are formed on the side of the principal surface 20a of the second plate-shaped member 20. These mirrors 21 to 24 are light reflective optical components in the present embodiment. These mirrors 21 to 24 are optical components in which a metal film 26 is formed on surfaces formed by applying etching to the silicon layer 25 of the SOI substrate, and totally reflect the light reaching these mirrors. In addition, in the present embodiment, the metal film 26 is formed on the principal surface 20a as well for convenience at the time of depositing the metal film 26. The respective mirror surfaces of the incident mirror 21 and the exit mirror 24 are inclined at an angle of, for example, 45° to the normal direction of the principal surface 20a. On the other hand, the respective mirror surfaces of the fixed reflecting mirror 22 and the movable reflecting mirror 23 are along the normal direction of the principal surface 20a, and formed so as to be substantially perpendicular to the principal surface 20a. The incident mirror 21 reflects light which transmits through the first plate-shaped member 10 from the normal direction of the principal surface 20a to be incident, toward the side surface 12a serving as a semi-transmissive reflecting surface of the light transmissive optical component 12. The fixed reflecting mirror 22 reflects the light emitted from the side surface 12c serving as a light transmitting surface of the light transmissive optical component 12, toward the side surface 12c. The movable reflecting mirror 23 reflects the light emitted from the side surface 12d serving as a light transmitting surface of the light transmissive optical component 12, toward the side surface 12d. In addition, the movable reflecting mirror 23 is capable of moving in parallel in a direction along an optical axis of incident light by an electrostatic actuator which will be described later. The exit mirror 24 reflects the light (interfering light) emitted from the side surface 12d serving as a light transmitting surface of the light transmissive optical component 12, toward the normal direction of the principal surface 20a. This interfering light transmits through the first plate-shaped member 10, to be emitted to the outside of the optical module.

A peripheral portion 20c of the second plate-shaped member 20 projects in its thickness direction with respect to the principal surface 20a, to surround the mirrors 21 to 24 which are the light reflective optical components. A plurality of (two in the present embodiment) alignment marks 27 for alignment with the first plate-shaped member 10 described above are formed at positions corresponding to the alignment marks 17 of the first plate-shaped member 10, on the peripheral portion 20c. In one example, the one alignment mark 27 is formed on the peripheral portion 20c in one side of the second plate-shaped member 20, and the other alignment mark 27 is formed on the peripheral portion 20c in the other side (preferably, the sided facing the one side) of the second plate-shaped member 20. These alignment marks 27 have a planar shape which is the same as that of the alignment marks 17 of the first plate-shaped member 10, and is composed of, for example, trenches formed in the peripheral portion 20c.

Figure 5:
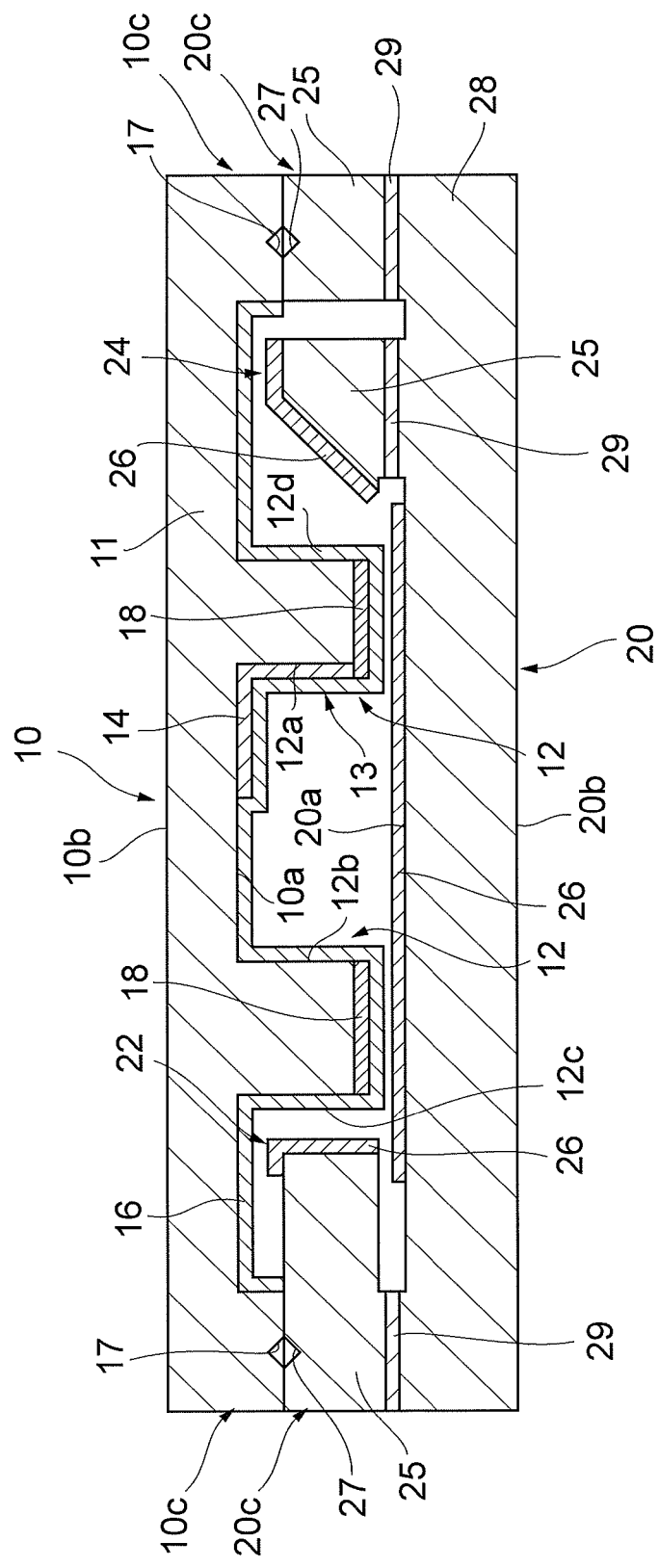
FIG. 5 is a cross-sectional view showing a state in which the first plate-shaped member and the second plate-shaped member are bonded to one another.

FIG. 5 is a cross-sectional view showing a state in which the first plate-shaped member 10 and the second plate-shaped member 20 are bonded to one another. As shown in FIG. 5, these plate-shaped members 10 and 20 are bonded to one another such that the component forming surface 10a on which the light transmissive optical component 12 is formed, of the first plate-shaped member 10, and the principal surface 20a of the second plate-shaped member 20 face one another. At this time, the light transmissive optical component 12 is disposed between the fixed reflecting mirror 22 and the exit mirror 24, and disposed between the incident mirror 21 and the movable reflecting mirror 23 shown in FIG. 3. Further, at this time, there is preferably a gap between the silicon nitride film 16 formed on the upper surface of the light transmissive optical component 12 and the metal film 26 formed on the principal surface 20a of the second plate-shaped member 20.

Figure 6:
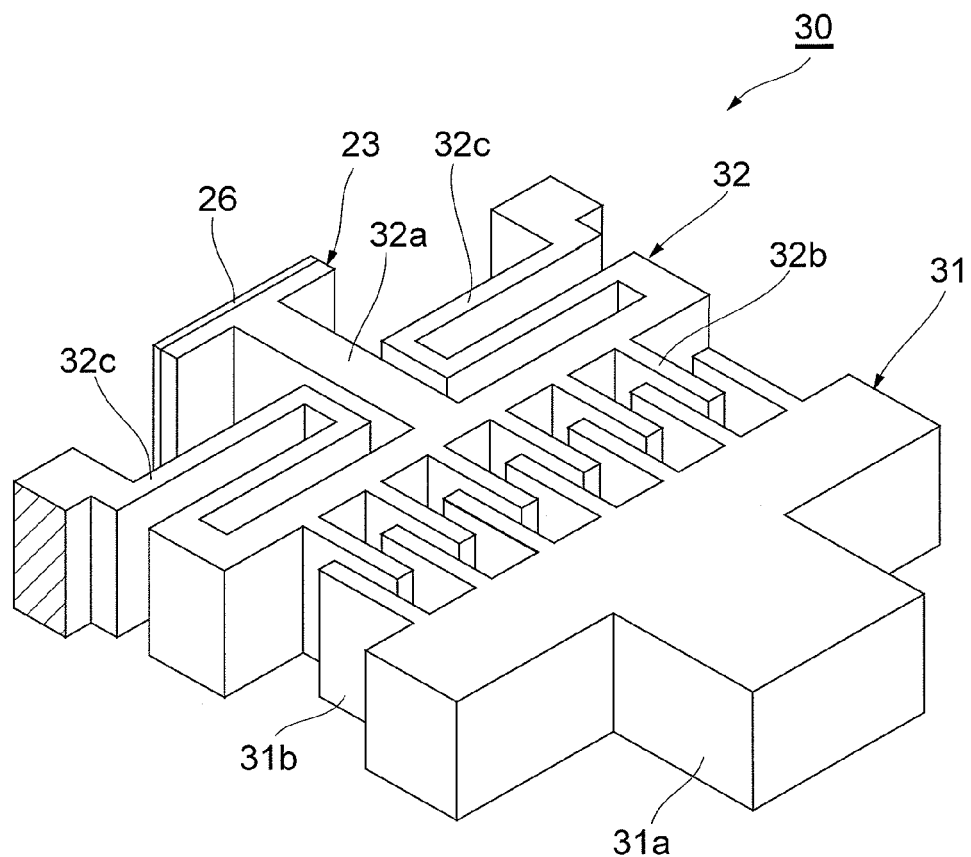
FIG. 6 is a perspective view showing an appearance of an electrostatic actuator that drives a movable reflecting mirror.

Here, FIG. 6 is a perspective view showing an appearance of an electrostatic actuator 30 that drives the movable reflecting mirror 23. As shown in FIG. 6, the electrostatic actuator 30 has a first electrode 31 fixed to the principal surface 20a of the second plate-shaped member 20, and a second electrode 32 fixed to the movable reflecting mirror 23. The electrostatic actuator 30 generates electrostatic force between the first electrode 31 and the second electrode 32, thereby relatively displacing the second electrode 32 with respect to the first electrode 31.

The first electrode 31 has a fixed portion 31a fixed to the support substrate 28 via the insulating layer 29 (refer to FIG. 4), and a comb portion 31b formed on the side surface of the fixed portion 31a facing the second electrode 32. In addition, the comb portion 31b is in a state of floating from the support substrate 28 by removing the insulating layer 29 between the portion and the support substrate 28.

The second electrode 32 is disposed between the movable reflecting mirror 23 and the first electrode 31. The second electrode 32 has a strut 32a which is extended in a direction perpendicular to the mirror surface of the movable reflecting mirror 23, to support the movable reflecting mirror 23 with its one end, a comb portion 32b which supports the other end of the strut 32a, and a supporting portion 32c which has a structure in which plate springs are coupled, to elastically support the both ends of the comb portion 32b. The strut 32a, the comb portion 32b, and the supporting portion 32c are in a state of floating from the support substrate 28 by removing the insulating layer 29 between those and the support substrate 28. Further, one end of the supporting portion 32c supports an end portion of the comb portion 32b, and the other end of the supporting portion 32c is fixed to the peripheral portion 20c (refer to FIG. 3) of the second plate-shaped member 20. With this configuration, the strut 32a and the comb portion 32b are capable of being displaced in a direction perpendicular to the mirror surface of the movable reflecting mirror 23. The comb portion 32b faces the comb portion 31b of the first electrode 31, and the comb teeth of the comb portion 32b are disposed between the respective comb teeth of the comb portion 31b.

When a predetermined voltage is applied to the second electrode 32, electrostatic force is applied between the comb portion 32b and the comb portion 31b. Because this electrostatic force is determined by a voltage value to be applied to the second electrode 32, a space between the comb portion 32b and the comb portion 31b is controlled by the voltage value. That is, the position in the direction perpendicular to the mirror surface of the movable reflecting mirror 23 supported by the comb portion 32b and the strut 32a is controlled by a voltage to be applied to the second electrode 32.

Figure 7:
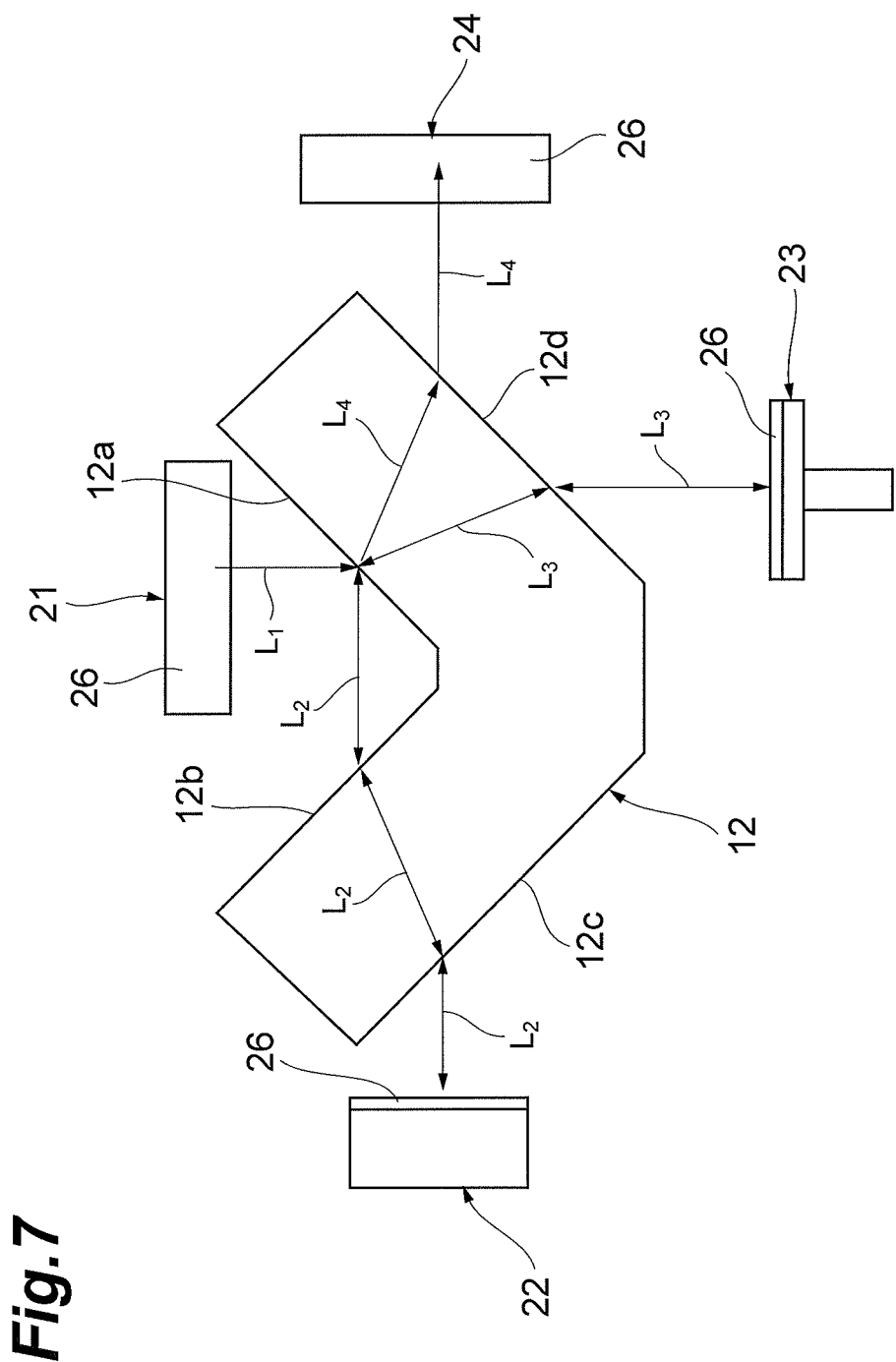
FIG. 7 is a plan view for explanation of a Michelson interference optical system configured by a light transmissive optical component and light reflective optical components.

FIG. 7 is a plan view for explanation of a Michelson interference optical system configured by the light transmissive optical component 12 and the light reflective optical components (the incident mirror 21, the fixed reflecting mirror 22, the movable reflecting mirror 23, and the exit mirror 24) which are described above. When measurement object light $L_1$ transmits through the first plate-shaped member 10 to be incident from the outside of the optical module, the incident mirror 21 reflects the measurement object light $L_1$ in a direction along the component forming surface 10a and the principal surface 20a. A part $L_2$ of the measurement object light $L_1$ is reflected on the side surface 12a (semi-transmissive reflecting surface) of the light transmissive optical component 12, to be incident into the side surface 12b serving as a light transmitting surface. This measurement object light $L_2$ transmits through the inside of the light transmissive optical component 12, to be emitted from the side surface 12c serving as a light transmitting surface, and reaches the fixed reflecting mirror 22. Then, this measurement object light $L_2$ is totally reflected on the fixed reflecting mirror 22, to thereafter track the same optical path described above back to the side surface 12a.

On the other hand, the remaining measurement object light $L_3$ other than the part of measurement object light $L_2$ reflected on the side surface 12a of the light transmissive optical component 12 is incident into the side surface 12a. This measurement object light $L_3$ transmits through the inside of the light transmissive optical component 12, to be emitted from the side surface 12d serving as a light transmitting surface, and reaches the movable reflecting mirror 23. Then, this measurement object light $L_3$ is totally reflected on the movable reflecting mirror 23, to thereafter track the same optical path described above back to the side surface 12a.

The measurement object light $L_2$ which is returned from the fixed reflecting mirror 22 to the side surface 12a and the measurement object light $L_3$ which is returned from the movable reflecting mirror 23 to the side surface 12a are coupled with each other on the side surface 12a, to become an interfering light image $L_4$. The interfering light image $L_4$ transmits through the inside of the light transmissive optical component 12, to be emitted from the side surface 12d, and reaches the exit mirror 24. The interfering light image $L_4$ is reflected on the exit mirror 24, and transmits through the first plate-shaped member 10, to be emitted to the outside of the optical module.

Next, a manufacturing method for the optical module according to the present embodiment will be described. FIG. 8 to FIG. 15 are diagrams showing the respective processes in a manufacturing method for the first plate-shaped member 10, and (a) in the figures are plan views of the region corresponding to the light transmissive optical component 12, and (b) in the figures are diagrams showing the cross-section taken along the line of B-B shown in (a).

<Mask Formation Process>

First, as shown in FIG. 8, a plate-shaped member including the silicon region 11 is prepared. As such a plate-shaped member, a silicon substrate, an SOI substrate in which an insulating layer and a silicon layer are laminated on a support substrate, or the like is preferable. Then, the silicon oxide film 18 is formed on the silicon region 11. This silicon oxide film 18 is a first mask in the present embodiment, and has a pattern corresponding to a planar shape of the light transmissive optical component 12 having the side surfaces 12a to 12d. In consideration of that this silicon oxide film is subjected to high temperatures in a thermal oxidation process which will be described later, a silicon oxide film is formed on the entire surface on the silicon region 11 by, for example, thermal oxidation or thermal CVD, to thereafter appropriately form the silicon oxide film 18 by use of a usual photolithographic technique.

Next, as shown in FIG. 9, a silicon nitride film 41 (second mask) is formed so as to cover the entire surface on the silicon region 11. In consideration of that the silicon nitride film is subjected to high temperatures in a thermal oxidation process which will be described later, the silicon nitride film 41 is appropriately formed by, for example, a low pressure-chemical vapor deposition method (LP-CVD: Low Pressure-Chemical Vapor Deposition) which is high temperature processing. At this time, the silicon oxide film 18 as well is covered with the silicon nitride film 41. Then, as shown in FIG. 10, a resist mask 42 (third mask) having an opening 42a is formed on the silicon nitride film 41. The opening 42a has a shape corresponding to a planar shape of a depressed portion in the silicon region 11 formed in the subsequent process, and is formed next to the silicon oxide film 18 so as not to be overlapped with the silicon oxide film 18 when viewed from the thickness direction of the silicon region 11. The planar shape of the opening 42a is, for example, a quadrangle shape, and one side thereof is overlapped with one side (a side corresponding to the side surface 12a of the light transmissive optical component 12) 18a of the silicon oxide film 18. Then, an opening is formed in the silicon nitride film 41 by applying etching to the silicon nitride film 41 by use of this resist mask 42 as an etching mask.

<First Etching Process>

Next, dry etching is applied to the silicon region 11 by use of the resist mask 42 as an etching mask. Thereby forming a depressed portion 11a in the silicon region 11, and simultaneously forming the side surface 12a of the light transmissive optical component 12 as a side surface of the depressed portion 11a. In addition, in the case where an SOI substrate is used as a plate-shaped member including the silicon region 11, the insulating layer functions as an etching stopper layer, and therefore, it is possible to control an etching depth with a high degree of accuracy. Further, in this process, for example, a deep RIE (reactive ion etching) process using a Bosch process may be used as a dry etching method. After this process, the resist mask 42 is removed.

In this first etching process, for example, wet etching using an alkaline etchant may be applied to the silicon region 11. Even in such a case, it is possible to appropriately form a side surface of the depressed portion 11a along the thickness direction (perpendicular to the board surface) of the silicon region 11 by a method of matching the side surface of the depressed portion 11a formed by etching to the crystal plane of the silicon region 11, or the like. As such a crystal plane, for example, a (100) plane or a (111) plane is preferable. In addition, in the case where the depressed portion 11a is formed by wet etching in this way, the resist mask 42 may be removed before etching, and the silicon nitride film 41 may be used as an etching mask.

<Thermal Oxidation Process>

Next, as shown in FIG. 11, the silicon oxide film 14 is formed by thermally oxidizing the inner surface (the side surfaces and the bottom surface) of the depressed portion 11a. At this time, because the surface of the silicon region 11 other than the inner surface of the depressed portion 11a is covered with the silicon nitride film 41, only the inner surface of the depressed portion 11a is thermally oxidized. Further, in this process, it is recommended that the film thickness of the silicon oxide film 14 formed by thermal oxidization be made to be approximately double (for example, 0.48 µm) the film thickness of the silicon oxide film 14 in a completed optical module. After this process, the silicon nitride film 41 is removed by use of a hot phosphoric acid solution heated to, for example, 150° C. to 170° C. (FIG. 12). By use of the hot phosphoric acid solution, it is possible to appropriately remove only the silicon nitride film 41 so that the silicon oxide films 14 and 18 remain.

<Second Etching Process>

Next, as shown in FIG. 13, the side surfaces 12b to 12d which are different from the side surface 12a are formed on the silicon region 11 by again applying etching to the silicon region 11 by use of the silicon oxide film 18 as an etching mask. Thereby, forming the light transmissive optical component 12. In addition, as an etching method in this process, any one of dry etching and alkaline wet etching may be used.

<Third Etching Process>

Next, in order to remove an unnecessary portion 14a (refer to FIG. 13) in the silicon oxide film 14, for example, etching using dilute hydrofluoric acid is carried out. At this time, because the portion 14a which is not along the silicon region 11 in the silicon oxide film 14 is etched from the both directions of the inner and outer surfaces with the dilute hydrofluoric acid, the etching is performed at about double the speed of that for the other portion along the silicon region 11. Accordingly, in the timing when the portion 14a is completely removed, the other portion (particularly the portion on the side surface 12a) is etched by about a half of the film thickness. With this process, as shown in FIG. 14, the unnecessary portion 14a of the silicon oxide film 14 is removed, and the other portion of the silicon oxide film 14 remains. In the case where the thickness of the silicon oxide film 14 immediately after the formation of the film by thermal oxidization is 0.48 µm, the thickness of the silicon oxide film 14 after this process is 0.24 µm. Because the reflectance of the semi-transmissive reflection film 13 varies according to this thickness, it is preferable to perform the above-described thermal oxidation process in consideration of a decrease in thickness of the silicon oxide film 14 in this process.

In addition, the unnecessary portion 14a of the silicon oxide film 14 is removed by etching in the above-described process, however, depending on the thickness of the portion 14a, the portion 14a may be broken to be removed by water pressure at the time of wet processing.

<Nitride Film Formation Process>

Next, as shown in FIG. 15, the silicon nitride film 16 is formed on the entire surface of the silicon region 11. In this process, the silicon nitride film 16 is formed so as to cover at least the silicon oxide film 14 on the side surface 12a, and the other side surfaces 12b to 12d. With this, the silicon nitride film 16 serving as an antireflection film is formed on the side surfaces 12b to 12d, and at the same time, the silicon nitride film 16 composing a part of the semi-transmissive reflection film 13 is formed on the silicon oxide film 14. In addition, in this process, in order to uniformly form the silicon nitride film 16 on the silicon oxide film 14 and the side surfaces 12b to 12d, it is preferable to form the silicon nitride film 16 by use of a low pressure-chemical vapor deposition method (LP-CVD) which is high temperature processing.

According to the method described above, the first plate-shaped member 10 is appropriately prepared. On the other hand, the portion other than the electrostatic actuator 30 in the second plate-shaped member 20 is prepared as follows for example. First, an SOT substrate is prepared. A silicon oxide film is formed on the surface of the silicon layer of the SOT substrate. Next, an opening corresponding to the inclined mirror surface of the incident mirror 21, and an opening corresponding to the inclined mirror surface of the exit mirror 24 are formed by applying etching to this silicon oxide film. Then, a silicon nitride film is formed over the entire area on the silicon layer of the SOT substrate. Openings respectively corresponding to the incident mirror 21, the fixed reflecting mirror 22, the movable reflecting mirror 23, and the exit mirror 24 are formed by applying etching to this silicon nitride film.

Next, dry etching is applied to the silicon layer via the silicon nitride film and the silicon oxide film. At this time, this etching is continued to be applied to the silicon layer until the insulating layer of the SOI substrate is exposed. Thereby, forming the incident mirror 21, the fixed reflecting mirror 22, the movable reflecting mirror 23, and the exit mirror 24 in the silicon layer. Then, after the exposed side surface of the silicon layer is protected by the silicon oxide film, the silicon nitride film is removed. At this time, the silicon nitride film is selectively etched so as to remain the silicon oxide film by use of, for example, hot phosphoric acid or the like. With this, the openings in the silicon oxide film corresponding to the inclined mirror surfaces of the incident mirror 21 and the exit mirror 24 come out again, and the silicon layer of the portions is exposed. Thereafter, wet etching is applied to the exposed silicon layer. At this time, anisotropic etching is applied to the exposed portion of the silicon layer by, for example, alkaline etching. Thereby, forming the inclined mirror surfaces of the incident mirror 21 and the exit mirror 24 in the silicon layer.

Next, the silicon oxide film is removed, and the metal film 26 is formed on the respective mirror surfaces of the incident mirror 21, the fixed reflecting mirror 22, the movable reflecting mirror 23, and the exit mirror 24. First, a shadow mask is disposed so as to cover the component forming surface of the SOI substrate. One large opening which includes all the portions serving as mirror surfaces respectively in the incident mirror 21, the fixed reflecting mirror 22, the movable reflecting mirror 23, and the exit mirror 24 is formed in this shadow mask. Then, a metal material is physically deposited via this shadow mask, thereby forming the metal film 26 on the respective mirror surfaces. At this time, as a method for forming the metal film 26, not only a high-energy sputtering method, but also resistance deposition and EB deposition are preferable. In this way, the second plate-shaped member 20 is appropriately prepared.

Figure 16:
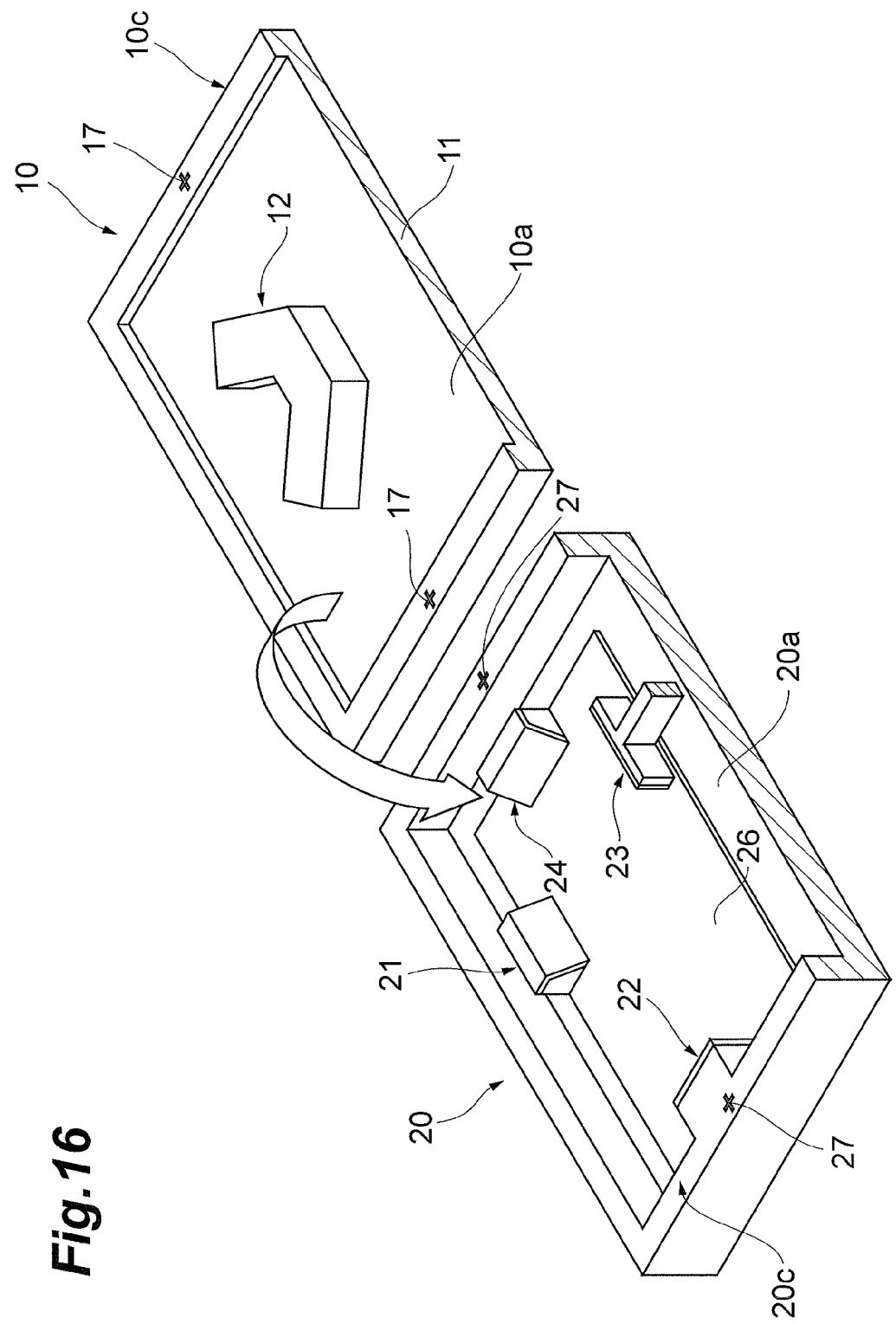
FIG. 16 is a perspective view schematically showing a state in which the first plate-shaped member and the second plate-shaped member are joined together.
Figure 17:
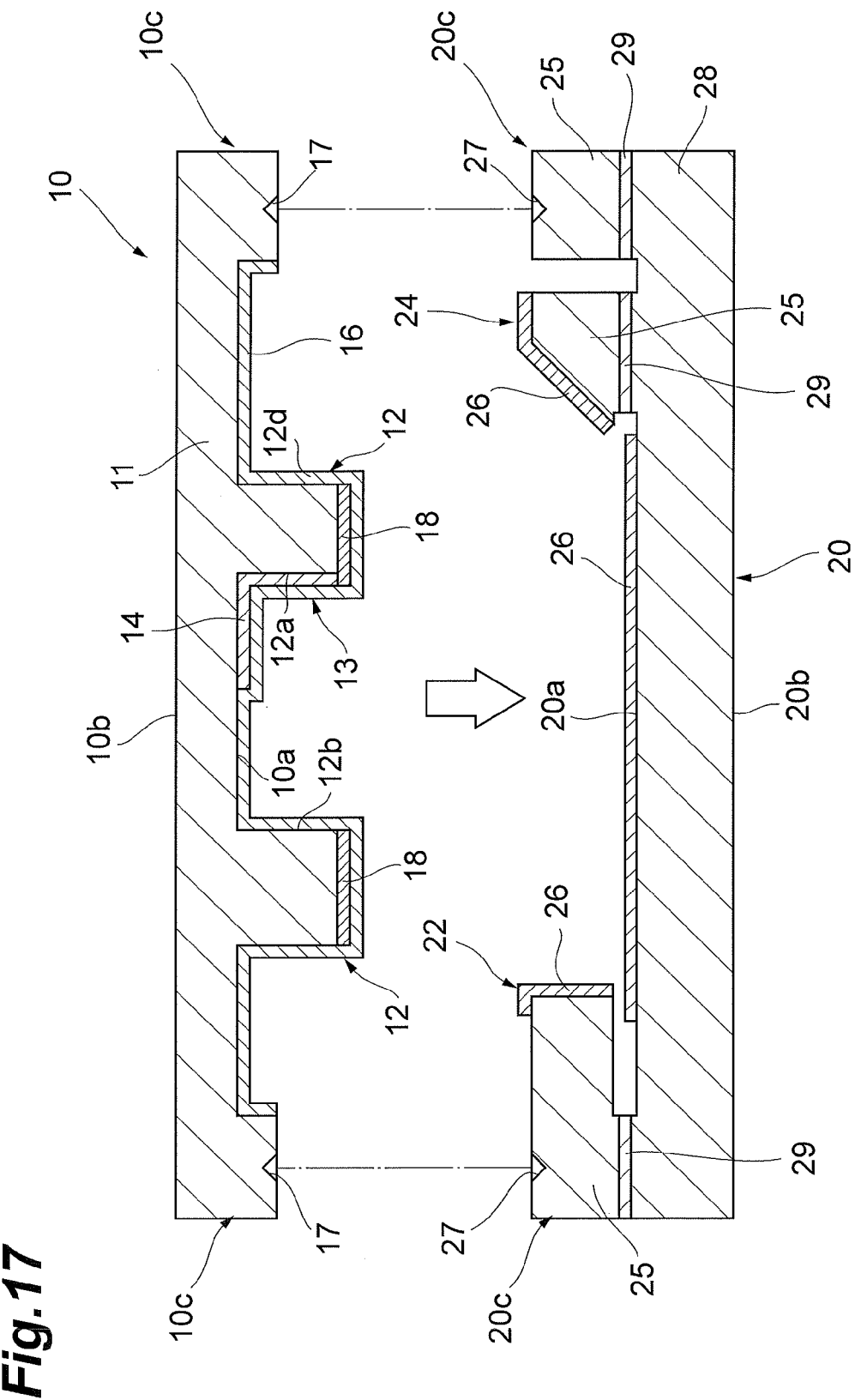
FIG. 17 is a diagram showing a state in which the first and second plate-shaped members are aligned so as to match the alignment marks.

FIG. 16 is a perspective view schematically showing a state in which the first plate-shaped member 10 and the second plate-shaped member 20 are joined together. In this process, the first and second plate-shaped members 10 and 20 are joined together such that the component forming surface 10a and the principal surface 20a face one another, and the light transmissive optical component 12 of the first plate-shaped member 10, and the incident mirror 21, the fixed reflecting mirror 22, the movable reflecting mirror 23, and the exit mirror 24 of the second plate-shaped member 20 are brought into the positional relationship shown in FIG. 7. At this time, the alignment marks 17 and 27 are formed respectively on the peripheral portion 10c of the first plate-shaped member 10 and the peripheral portion 20c of the second plate-shaped member 20, and it is recommended that, as shown in FIG. 17, the peripheral portions 10c and 20c be bonded to one another after the first and second plate-shaped members 10 and 20 are aligned such that these alignment marks 17 and 27 are matched to one another. Further, as a method for bonding the first and second plate-shaped members 10 and 20, a method of directly bonding those, a method of bonding those via solder, a method of bonding those via resin, or the like is preferable.

Effects by the optical module and the manufacturing method for the optical module according to the present embodiment, which have been described above, will be described along with the problems confronting the general optical module using the MEMS technology.

In accordance with the MEMS technology, fine and highly-accurate processing using a semiconductor photolithographic technique is possible, and it is possible to appropriately prepare an optical module having an optical interferometer and a diffracting grating for processing light as a wave. In particular, in the MEMS process using a silicon substrate or an SOI substrate, because the silicon has moderate elasticity, it is possible to prepare a sensor or an actuator with good mechanical characteristics and high reliability, and it is possible to form an inclined plane by utilizing the anisotropic nature of silicon crystal, and form a deep trench using a Bosch process. Therefore, the MEMS technology is utilized for manufacturing an acceleration sensor, a pressure sensor, a pixel mirror of a projector (a digital mirror device or the like), an optical interferometer for an FTIR (Fourier Transform Infrared Spectrometer), and the like. In particular, an optical interferometer is broadly applicable, and is applicable to not only an FTIR, but also an OCT (Optical Coherent Tomography), and film thickness measurement, surface roughness measurement, and the like, and it is possible to compactly configure these measuring devices.

However, in the case where various types of optical modules are prepared by applying the MEMS process to silicon substrates and the like, there are the following problems.

(1) Light use efficiency in a light transmissive optical component such as a beam splitter is low.

(2) In the case where a metal film is formed with a shadow mask for forming a reflecting mirror, it is necessary to dispose the other optical components separately from the reflecting mirror in order to prevent the metal from adhering to other optical components that makes these distances (i.e., an optical path length) longer.

(3) In the case where a light transmissive optical component such as a beam splitter and a conductive component such as an electrostatic actuator are mixed in an optical module, when an impurity concentration of silicon is increased in order to improve the electrical conductive property of the conductive component, absorption of light in the light transmissive optical component is increased, which leads to a lowering of the light use efficiency. In contrast, when an impurity concentration of silicon is decreased in order to inhibit absorption of light in the light transmissive optical component, the electrical conductive property of the conductive component is decreased, which makes it impossible to secure a favorable operation. In this way, it is impossible to satisfy the contradictory requirements for the light transmissive optical component and the conductive component. Hereinafter, these problems (1) to (3) will be described in detail.

(1) Light use efficiency in a light transmissive optical component is low.

Figure 18:
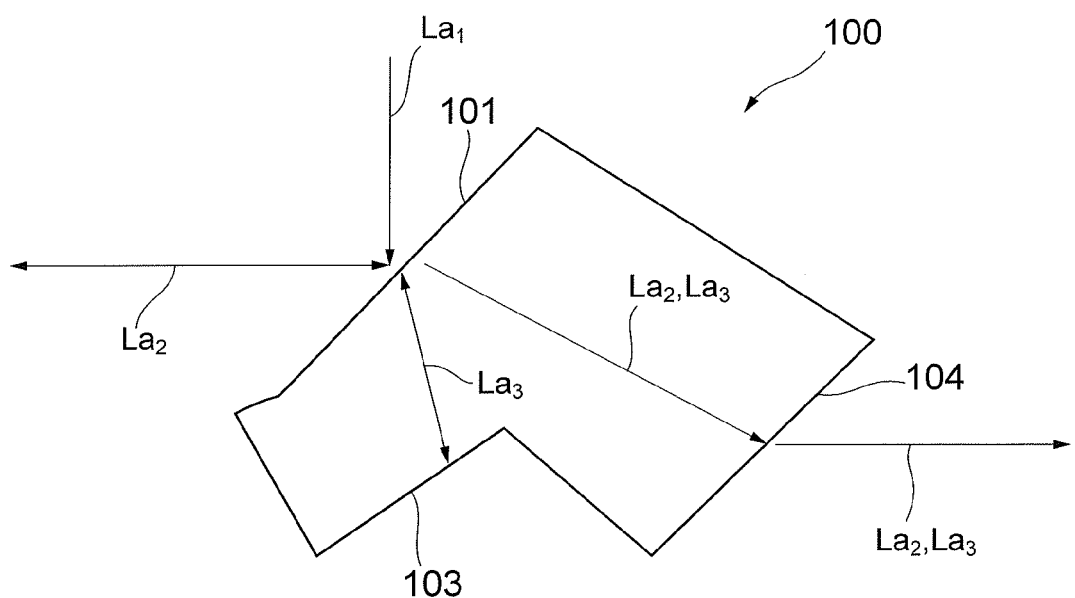
FIG. 18 is a plan view schematically showing a beam splitter used for an interference optical system or the like, as an example of a light transmissive optical component.

FIG. 18 is a plan view schematically showing a beam splitter 100 used for an interference optical system or the like, as an example of a light transmissive optical component. This beam splitter 100 has a semi-transmissive reflecting surface 101, a light reflecting surface 103, and a light transmitting surface 104. Here, for example, because the refractive index of silicon in a wavelength band of 1 μm is approximately 3.5, the reflectance of Fresnel reflection on the silicon surface is approximately 30%. That is, 30% of light $La_1$ reaching the semi-transmissive reflecting surface 101 is reflected on the semi-transmissive reflecting surface 101. In addition, this reflected light $La_2$ is reflected by a movable reflecting mirror, which is not shown, to return to the semi-transmissive reflecting surface 101, and 70% of the light transmits through the semi-transmissive reflecting surface 101, to reach the light transmitting surface 104. Further, the remaining 70% ($La_3$) of the light $La_1$ is incident into the beam splitter 100 from the semi-transmissive reflecting surface 101, and is reflected on the light reflecting surface 103, to return to the semi-transmissive reflecting surface 101. 30% of the light $La_3$ returning to the semi-transmissive reflecting surface 101 is again reflected on the semi-transmissive reflecting surface 101, to reach the light transmitting surface 104. Then, the respective 70% of the light components $La_2$ and $La_3$ reaching the light transmitting surface 104 are emitted to the outside of the beam splitter 100 from the light transmitting surface 104.

However, the reflectance (30%) on the semi-transmissive reflecting surface 101 of the beam splitter 100 shown in FIG. 18 is not an ideal value as an optical interferometer. In an optical interferometer, an amplitude A of interfering light to be finally taken out is expressed by the following formula (1) given that a reflectance on the semi-transmissive reflecting surface 101 is r.

[Formula 1]

$$A = 2r(1-r) \quad (1)$$

In accordance with this formula (1), the amplitude A reaches a maximum value (0.5) when r is 0.5 (i.e., the reflectance is 50%). On the other hand, when r is 0.3 (i.e., the reflectance is 30%), A becomes 0.41, and the light use efficiency is decreased by approximately 20%. Moreover, because a loss of 30% is caused at the time of emitting the light components $La_2$ and $La_3$ from the beam splitter 100, the final light use efficiency is decreased to 41%×70%=28.7%. In addition, the reflectance on the light reflecting surface 103 is given as 100% in this calculation, meanwhile, in the case where it is impossible to form a metal film on the light reflecting surface 103, the light use efficiency is further lowered.

Such a lowering of the light use efficiency becomes more prominent due to compensation for wavelength dispersion of silicon. An optical path length of light transmitting through the inside of a light transmissive optical component formed of silicon differs according to wavelength of the light. For example, in the case where a wavelength of light transmitting through the light transmissive optical component is within a range from 1 μm to 1.7 μm, the refractive index of the light transmissive optical component formed of silicon varies according to a wavelength within a range of approximately 3.5±0.04. Here, the beam splitter 100 shown in FIG. 18 will be described as an example. Assuming that a beam width of the light components $La_1$ to $La_3$ is 150 μm, in order for the light components $La_2$ and $La_3$ to advance toward the light transmitting surface 104 without being blocked by the light reflecting surface 103, at least approximately 360 μm is needed as a length of an optical path between the semi-transmissive reflecting surface 101 and the light reflecting surface 103. Then, because the light $La_2$ goes back and forth on this optical path, the propagation distance of the light $La_2$ therebetween is approximately 720 μm. As a result, in the above-described wavelength range, 720 μm×±0.04=±29 μm, that is, 58 μm at a maximum is deviated in equivalent optical path length at each wavelength of the light $La_2$, which deteriorates the interfering light image. In addition, it is possible to calculate a phase deviation (which is equivalent to an optical path deviation) by use of the complex Fourier transform, meanwhile, this is unfavorable because the necessity of apodizing correction or the like is increased, which leads to deterioration in resolution.

Figure 19:
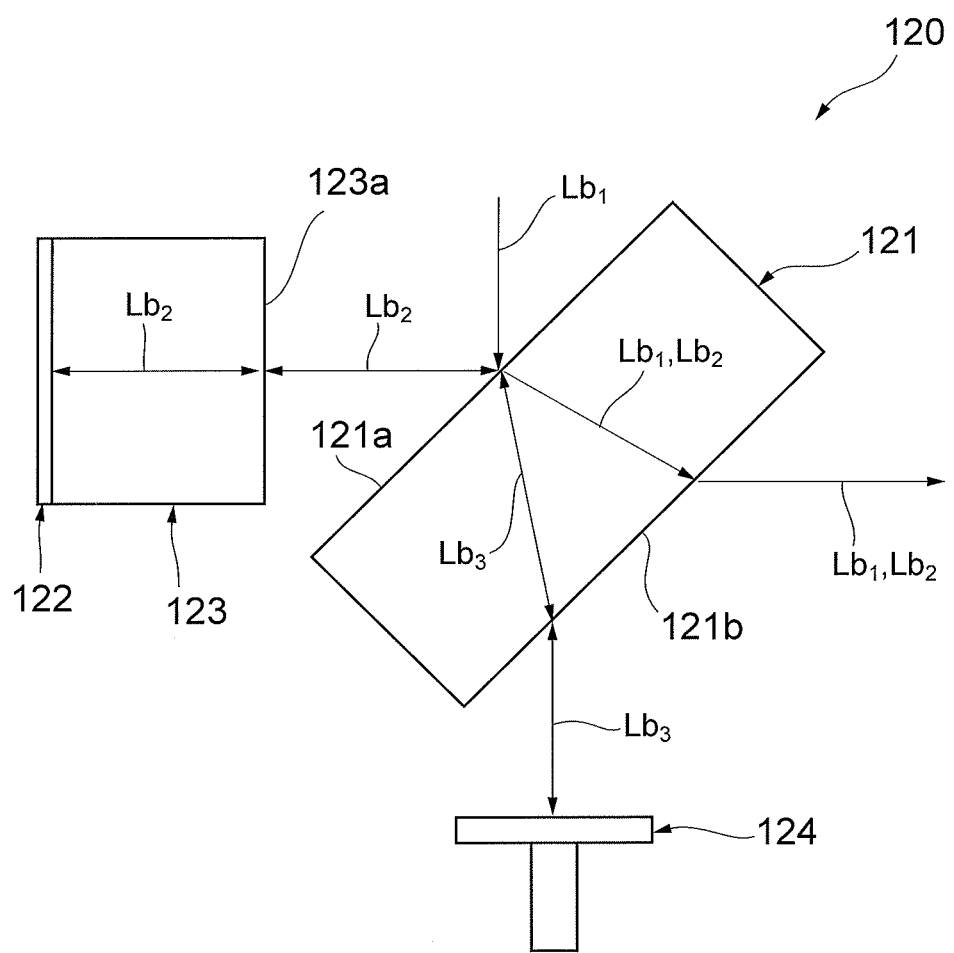
FIG. 19 is a plan view showing a configuration example of an interference optical system having an optical member for compensating wavelength dispersion.

For these reasons, an optical member for compensating wavelength dispersion is provided. FIG. 19 is a plan view showing a configuration example of an interference optical system having an optical member for compensating wavelength dispersion. As shown in FIG. 19, this interference optical system 120 has a beam splitter 121, a fixed reflecting mirror 122, a wavelength dispersion compensating member 123 made of silicon which is provided in front of the fixed reflecting mirror 122, and a movable reflecting mirror 124. One side surface 121a of the beam splitter 121 is utilized as an optical branching surface, and the other side surface 121b is utilized as a light transmitting surface. When light $Lb_1$ incident into the side surface 121a of the beam splitter 121, $Lb_2$ which is a part (30%) of this light $Lb_1$ is reflected on the side surface 121a, and passes through a side surface 123a of the wavelength dispersion compensating member 123, to reach the fixed reflecting mirror 122. This light $Lb_2$ is reflected on the fixed reflecting mirror 122, and again passes through the side surface 123a of the wavelength dispersion compensating member 123, to return to the side surface 121a. On the other hand, the $Lb_3$ which is the other part (70%) of the light $Lb_1$ transmits through the side surface 121a, and is emitted from the side surface 121b, to reach the movable reflecting mirror 124. This light $Lb_3$ is reflected on the movable reflecting mirror 124, and again passes through the side surface 121b, to return to the side surface 121a. The light components $Lb_2$ and $Lb_3$ returning to the side surface 121a are emitted to the outside from the side surface 121b.

In accordance with the interference optical system 120 shown in FIG. 19, the optical path length of the light $Lb_2$ and the optical path length of the light $Lb_3$ are equalized, thereby it is possible to compensate the above-described wavelength dispersion. However, when an optical member for wavelength dispersion compensation (the wavelength dispersion compensating member 123) is provided in this way, the number of light transmitting surfaces through which light passes is increased, and a loss is caused every time the light passes through those light transmitting surfaces, which leads to a further lowering of the light use efficiency. For example, in the interference optical system 120 shown in FIG. 19, the light use efficiency is as follows.

[Formula 2]

$$2 \times \sqrt{30\% \times 70\% \times 70\% \times 70\% \times 70\% \times} \\ \sqrt{70\% \times 70\% \times 70\% \times 30\% \times 70\%} = 14.4\% \quad (2)$$

The problem as described above is relieved by providing an antireflection film (AR coat) on the light transmitting surface, and providing a semi-transmissive reflection film on the optical branching surface. For example, in the case where antireflection films with a reflectance of 5% are formed on the side surfaces 121b and 123a of the interference optical system 120 shown in FIG. 19, and a semi-transmissive reflection film with a reflectance of 50% is formed on the side surface 121a, the light use efficiency is greatly improved as follows.

[Formula 3]

$$2 \times \sqrt{95\% \times 50\% \times 95\% \times 95\% \times 50\% \times 95\% \times} \\ \sqrt{95\% \times 50\% \times 95\% \times 95\% \times 50\% \times 95\%} = 41\% \quad (3)$$

These antireflection films are appropriately prepared by forming a dielectric film such as a silicon nitride film on light transmitting surfaces by use of CVD or the like. Further, the semi-transmissive reflection film is prepared by laminating, for example, a silicon oxide film and a silicon nitride film on the optical branching surface by use of CVD or the like. However, in the case where such an interference optical system is prepared by the MEMS technology, an antireflection film and a semi-transmissive reflection film are formed on light transmissive optical components formed by applying etching to a silicon substrate or an SOI substrate. Because other various types of processes such as a process of depositing a metal film are mixed in the MEMS technology, when an interference optical system is prepared from one substrate as in the conventional technology, various restrictions on processes are generated, and the processes are complicated.

(2) The distance between the optical components is made long due to the formation of a metal film by a shadow mask.

Figure 20:
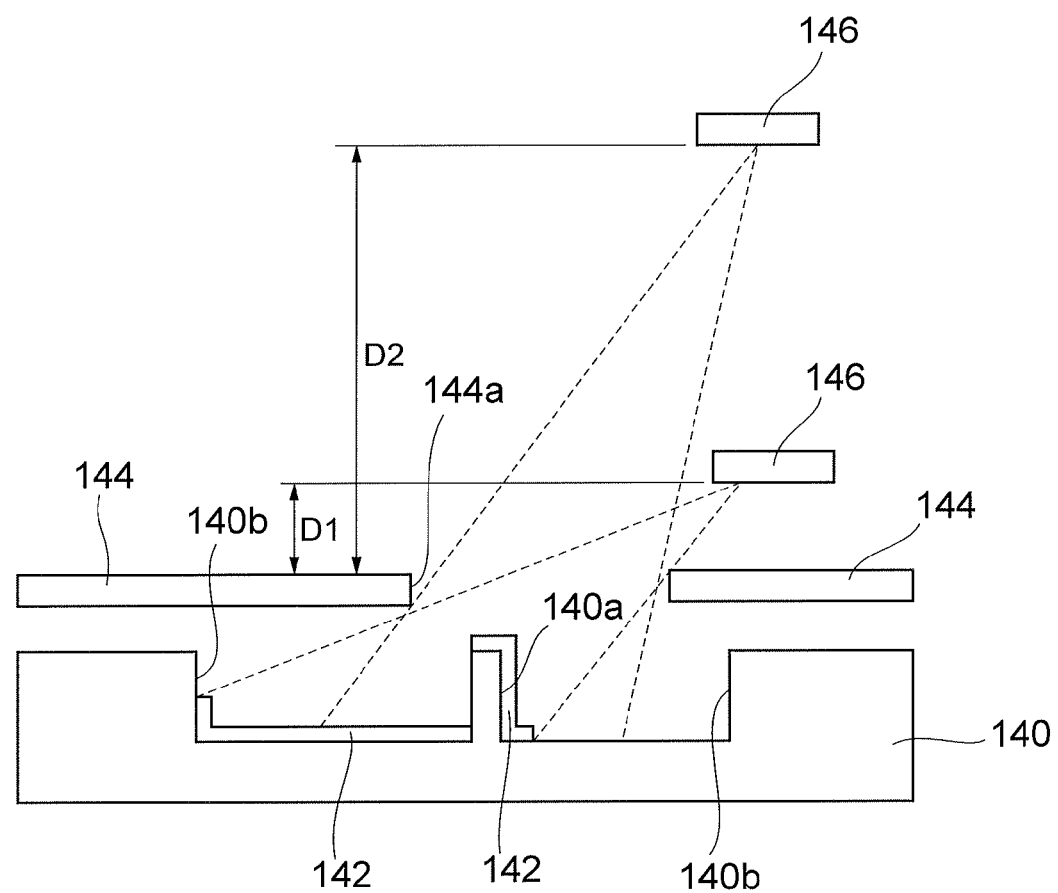
FIG. 20 is a cross-sectional view showing a state in which a metal film is formed by use of a shadow mask in an interference optical system.

FIG. 20 is a cross-sectional view showing a state in which a metal film is formed by use of a shadow mask in an interference optical system. FIG. 20 shows a side surface 140a of a silicon region 140 serving as a light reflecting surface which is a film-forming target, and a side surface 140b of the silicon region 140 serving as a light transmitting surface (or a semi-transmissive reflecting surface) which is not a film-forming target. At the time of forming a metal film 142 on the side surface 140a, a shadow mask 144 is disposed on the silicon region 140. An opening 144a is formed in this shadow mask 144, and a metal material emitted from a target 146 scatters on the silicon region 140 to a limited extent via this opening 144a.

Usually, in such a metal film formation using a shadow mask, a film-forming target surface and a target are disposed so as to face one another. However, because it is necessary to form a film on a light reflecting surface which is substantially perpendicular to a substrate surface in an interference optical system using the MEMS technology, as shown in FIG. 20, it is necessary to increase the transverse component in the scattering direction of metallic particles by making a distance D1 between the target 146 and the shadow mask 144 shorter than a conventional distance D2. Accordingly, in order to prevent that the metal adheres to the side surface 140b which is not a film-forming target, which leads to a lowering in the optical transmittance, it is necessary to make a distance between the side surface 140a and the side surface 140b longer. This means that an optical path length between the light reflecting surface and the light transmitting surface (or the semi-transmissive reflecting surface) is made longer.

In many optical modules, it is not preferable that an optical path length between the optical components is made longer. For example, in an optical interferometer, light branched on the semi-transmissive reflecting surface must reach a photodetector without any loss on the way. For this, it is preferable that the light is almost a parallel light during propagation of the light in the interference optical system. Usually, in the case where a noncoherent light is used in a spectroscope or the like, it is extremely difficult to narrow down the incident beam diameter thereof into a range from several μm to several tens of without any loss. In general, a size of an entrance window of an incident beam diameter is several hundreds of μm or more, and a beam passing through a window with such a size has spreading components at various angles, and it is extremely difficult to produce a parallel light with the same degree of a beam diameter.

In addition, in a lens system whose image magnifying power is m, its beam diameter is magnified m times, and at the time, a spread angle (an aperture ratio NA) of the beam diameter is converted into 1/m. It is synonymous that a beam is made into a parallel light with that a spread angle of the beam is made narrower, and accordingly, the image magnifying power m may be increased. However, this means that it is impossible to convert a beam with a certain beam diameter and at a given spread angle into a parallel light with a smaller beam diameter. For example, when an attempt is made to convert a beam emitted from an optical fiber with a core diameter of 200 μm and at an NA of 0.2 into a parallel light at an NA of approximately 0.002 (with a spread of approximately 2 μm for 1 mm), the beam diameter becomes 20 mm that is a hundred times of the original one. Because a dimension of a light transmitting surface or a light semi-transmissive reflecting surface formed by the MEMS technology is approximately 100 μm to several hundreds of μm, a beam with such a large beam diameter is mostly lost during its propagation in the optical system. With the above descriptions, in a small optical system prepared by the MEMS technology, it is important to make an optical path length as short as possible in order to reduce a loss.

(3) It is impossible to satisfy the contradictory requirements for the light transmissive optical component and the conductive component.

In order to efficiently drive a conductive component such as an electrostatic actuator, it is preferable that the electrical resistance of silicon composing the conductive component is lower. Because the electrostatic actuator operates by electrostatic force by a voltage to be applied to the respective electrodes, basically direct-current electricity does not flow therein. However, because an alternating current flows therein, in the case where the electrical resistance of silicon composing the respective electrodes is high, the electric power is converted into heat, to be lost. Further, when the electrical resistance value is high, a time constant of the response characteristics of the electrostatic actuator is increased, that slows down the speed of operation thereof. From these facts, the better the lower the electrical resistance of silicon composing the electrostatic actuator is. In other words, the better, the higher the impurity concentration of silicon composing the electrostatic actuator is.

On the other hand, in a light transmissive optical component such as a beam splitter, the better the lower the impurity concentration of silicon is. A pure silicon single crystal without impurities has an extremely high transparency up to a thickness of at least approximately 100 μm in a wavelength band of 1 μm or more. However, when the impurity concentration thereof is high, absorption or scattering due to the impurities is caused, which causes a loss in transmitted light.

In this way, there are requirements contradictory with one another from the viewpoint of impurity concentration of silicon between a light transmissive optical component and a conductive component. However, in the optical modules described in Patent Document 1 and Patent Document 2, because these components are prepared from one substrate, it is difficult to satisfy these requirements at one time.

In response to the problems (1) to (3) described above, in the optical module and the manufacturing method for the optical module according to the present embodiment, as shown in FIG. 1 to FIG. 5, the light transmissive optical component 12 and the light reflective optical components (the incident mirror 21, the fixed reflecting mirror 22, the movable reflecting mirror 23, and the exit mirror 24) are respectively formed on the separate plate-shaped members 10 and 20. Accordingly, at the time of forming these optical components on the respective plate-shaped members 10 and 20, it is possible to match the characteristics such as an impurity concentration of the substrate to the characteristics most suitable for the respective optical components. For example, impurities are not added to the silicon region 11 of the first plate-shaped member 10 on which the light transmissive optical component 12 is formed, to inhibit absorption of light, and appropriate amounts of impurities are added to the silicon layer 25 of the second plate-shaped member 20 on which the movable reflecting mirror 23 is formed, to secure favorable electric conductivity, thereby it is possible to improve the electrical characteristics of a conductive component such as an electrostatic actuator 30 that drives the movable reflecting mirror 23.

Further, in accordance with the optical module and the manufacturing method for the optical module according to the present embodiment, because it is possible to separately form the light transmissive optical component 12 and the light reflective optical components (the incident mirror 21, the fixed reflecting mirror 22, the movable reflecting mirror 23, and the exit mirror 24) on the respective plate-shaped members 10 and 20, it is sufficient that the first plate-shaped member 10 and the second plate-shaped member 20 be bonded to one another after depositing the metal film 26 on the second plate-shaped member 20, which makes it possible to reliably prevent metallic particles from adhering to the light transmissive optical component 12 at the time of depositing the metal film 26. Accordingly, it is possible to dispose the mirrors 21 to 24 of the second plate-shaped member 20 and the light transmissive optical component 12 close to one another, which makes it possible to improve the light use efficiency.

Further, in accordance with the optical module and the manufacturing method for the optical module according to the present embodiment, it is possible to separately form the light transmissive optical component 12 and the light reflective optical components on the respective plate-shaped members 10 and 20. Accordingly, for example, on the first plate-shaped member 10, it is possible to form the semi-transmissive reflection film 13 composed of the silicon oxide film 14 and the silicon nitride film 16, and the antireflection film composed of the silicon nitride film 16 onto the respective side surfaces 12a to 12d of the light transmissive optical component 12, and on the other hand, on the second plate-shaped member 20, it is possible to form a component of a complicated shape such as the electrostatic actuator 30. In this way, because it is possible to carry out the processes of forming various types of optical components formed by the MEMS technology completely separately and in parallel, it is possible to relieve the restrictions on the processes, and simplify the processes.

In addition, in the present embodiment, the light reflective optical components (the incident mirror 21, the fixed reflecting mirror 22, the movable reflecting mirror 23, and the exit mirror 24) of the second plate-shaped member 20 are formed by applying etching to the silicon layer 25. Because it is easy to process silicon by etching, it is possible to easily form the light reflective optical components thereby. In addition, these optical components may be formed by applying etching to a layer formed of, not only silicon, but also another semiconductor material.

Further, as in the present embodiment, the second plate-shaped member 20 may have the electrostatic actuator 30 that drives the movable reflecting mirror 23. As mentioned above, in the present embodiment, it is possible to optimize the impurity concentration for each of the respective plate-shaped members 10 and 20. Accordingly, even in the case where the second plate-shaped member 20 has the electrostatic actuator 30 as in the present embodiment, while appropriate amounts of impurities are added to the second plate-shaped member 20, which makes it possible to secure the conductivity, impurities are not added to the first plate-shaped member 10, which makes it possible to inhibit absorption of light in the light transmissive optical component 12.

Further, as in the present embodiment, the exit mirror 24 may reflect the light transmitting through the light transmissive optical component 12 toward the first plate-shaped member 10, and the first plate-shaped member 10 may allow the light to transmit through it. Thereby, it is possible to appropriately output the interfering light transmitting through the light transmissive optical component 12 to the outside of the optical module.

Further, as in the present embodiment, it is preferable that a specific resistance of the silicon region 11 of the first plate-shaped member 10 is higher than a specific resistance of the silicon layer 25 of the second plate-shaped member 20. In this case, because the impurity concentration of the silicon region 11 is lower than the impurity concentration of the silicon layer 25, it is possible to effectively inhibit absorption of light in the light transmissive optical component 12.

Further, in the present embodiment, the semi-transmissive reflection film 13 is provided on the one side surface 12a among the plurality of side surfaces 12a to 12d formed by applying etching to the silicon region 11 in the light transmissive optical component 12, and the antireflection film (the silicon nitride film 16) is provided on the other side surfaces. With this, it is possible to appropriately realize a beam splitter as the light transmissive optical component 12.

Further, as in the present embodiment, it is preferable to respectively form a plurality of alignment marks 17 and 27 for alignment of the first and second plate-shaped members 10 and 20 on the peripheral portion 10c of the first plate-shaped member 10 and the peripheral portion 20c of the second plate-shaped member 20. With this, it is possible to reduce a relative angle deviation between the first plate-shaped member 10 and the second plate-shaped member 20, and inhibit a lowering of the light use efficiency.

FIG. 21 includes diagrams for explanation of problems caused by a positional deviation between the first plate-shaped member 10 and the second plate-shaped member 20, and shows the relative positional relationship between the light transmissive optical component 12 of the first plate-shaped member 10 and the light reflective optical components (the incident mirror 21, the fixed reflecting mirror 22, the movable reflecting mirror 23, and the exit mirror 24) of the second plate-shaped member 20. (a) in FIG. 21 shows the original position by the solid line and the position at which a positional deviation is caused by the dashed-dotted line in the case where the light transmissive optical component 12 is deviated in parallel with no angular change with respect to the incident mirror 21, the fixed reflecting mirror 22, the movable reflecting mirror 23, and the exit mirror 24. Further, (b) in FIG. 21 shows the original position by the solid line and the position at which a positional deviation is caused by the dashed-dotted line in the case where an angle deviation of the light transmissive optical component 12 is caused with respect to the incident mirror 21, the fixed reflecting mirror 22, the movable reflecting mirror 23, and the exit mirror 24.

Usually, the accuracy of bonding in flip-chip bonding is approximately several μm to 10 μm. Accordingly, with respect to a positional deviation as shown in (a) in FIG. 21, the optical axes of light components reaching the respective mirrors 21 to 24 are deviated by only approximately several μm to 10 μm, which does not become a major issue in the case where the respective mirrors 21 to 24 have widths of approximately 100 μm to 1000 μm. In addition, with respect to positional deviations toward the normal directions of the mirror surfaces of the respective mirrors 21 to 24 as well, it is possible to correct those, for example, as long as a motion distance of the movable reflecting mirror 23 is 100 μm or more.

On the other hand, an angle deviation as shown in (b) in FIG. 21 becomes a major issue. For example, it is assumed that a size of the entire interference optical system (for example, a distance from the fixed reflecting mirror 22 to the exit mirror 24) is 3 mm. Then, a distance between the both ends of the light transmissive optical component 12 is set to 1 mm, and the accuracy of bonding in flip-chip bonding is set to 10 μm. At this time, an angle deviation of the light transmissive optical component 12 is $\tan^{-1}(0.02/1)=1.1°$ at a maximum. An optical path of the measurement object light $L_2$ advancing toward the fixed reflecting mirror 22 is gradually separated away from the original optical path due to such an angle deviation of the semi-transmissive reflecting surface 12a. Because this measurement object light $L_2$ is reflected on the fixed reflecting mirror 22, to advance by the distance to the exit mirror 24 on the opposite side, if in the case where the semi-transmissive reflecting surface 12a is at the center of the interference optical system (that is, at a position of 1.5 mm from the fixed reflecting mirror 22 and the exit mirror 24), the measurement object light $L_2$ is reflected on the semi-transmissive reflecting surface 12a, to thereafter propagate by the distance of 4.5 mm. Accordingly, a positional deviation at the exit mirror 24 due to an angle deviation of the light transmissive optical component 12 becomes 4.5 mm×tan(1.1°)=86 μm.

Moreover, the measurement object light $L_3$ reflected from the movable reflecting mirror 23 as well is caused to have an angle deviation when being reflected on the semi-transmissive reflecting surface 12a. A positional deviation when this measurement object light $L_3$ reaches the exit mirror 24 is approximately 30 μm. That is, the positional deviations of the measurement object light components $L_2$ and $L_3$ in the exit mirror 24 are added to be approximately 110 μm, which is a non-negligible level with respect to the width of the exit mirror 24.

In response to this problem, in the present embodiment, the plurality of alignment marks 17 and 27 are formed on the peripheral portions 10c and 20c of the plate-shaped members 10 and 20, and the peripheral portions 10c and 20c are bonded to one another by use of these alignment marks 17 and 27. In this case, because the distance (for example, 3 mm or more) between the plurality of alignment marks 17 and 27 may be made longer than a distance (for example, 1 mm) between the both ends of the light transmissive optical component 12, even in the case where the accuracy of bonding (for example, approximately 10 μm) in flip-chip bonding does not change, it is possible to reduce a relative angle deviation between the first plate-shaped member 10 and the second plate-shaped member 20. Accordingly, it is possible to reduce a positional deviation of an interfering light in the respective mirrors 21 to 24 (in particular the exit mirror 24), which makes it possible to inhibit a lowering of the light use efficiency.

To cite an example, in the case where a space between the alignment marks is, for example, 5 mm, given that the accuracy of bonding in flip-chip bonding is 10 μm, an angle deviation of the semi-transmissive reflecting surface 12a, positional deviations of the measurement object light components $L_2$ and $L_3$ in the exit mirror 24, and a positional deviation into which the positional deviations of the measurement object light components $L_2$ and $L_3$ are added are respectively as follows.

Angle deviation of the semi-transmissive reflecting surface 12a: $\tan^{-1}(0.02/5)=0.23°$
Positional deviation of the measurement object light $L_2$ in the exit mirror 24: 4.5 mm×tan (0.23°)=18 μm
Positional deviation of the measurement object light $L_3$ in the exit mirror 24: 1.5 mm×tan (0.23°)=6 μm
Total positional deviation of addition of the measurement object light components $L_2$ and $L_3$: 24 μm
Because it is possible to reduce the positional deviations in this way, it is possible to easily respond thereto by widening the width of the exit mirror 24 or the like.

In addition, in the present embodiment, the peripheral portion 10c of the first plate-shaped member 10 slightly projects in its thickness direction with respect to the component forming surface 10a, and the peripheral portion 20c of the second plate-shaped member 20 projects in its thickness direction with respect to the principal surface 20a. The forms of the peripheral portions 10c and 20c are not limited to those, and for example, one of the peripheral portions 10c and 20c may not project, and the other one may project in a large way, thereby bringing these into contact with one another. In particular, in the case where the second plate-shaped member 20 is prepared from an SOI substrate as in the present embodiment, it is preferable that the support substrate 28 is exposed on the peripheral portion 20c by applying etching to the insulating layer 29 to remove the insulating layer, and the exposed support substrate 28 and the peripheral portion 10c of the first plate-shaped member 10 are bonded to one another. Further, in this case, it is preferable that the upper surface of the light transmissive optical component 12 of the first plate-shaped member 10 is etched to a slight extent, to be lower than the upper surface of the peripheral portion 10c, thereby preventing contact between the light transmissive optical component 12 and the second plate-shaped member 20.

First Modified Example

Figure 22:
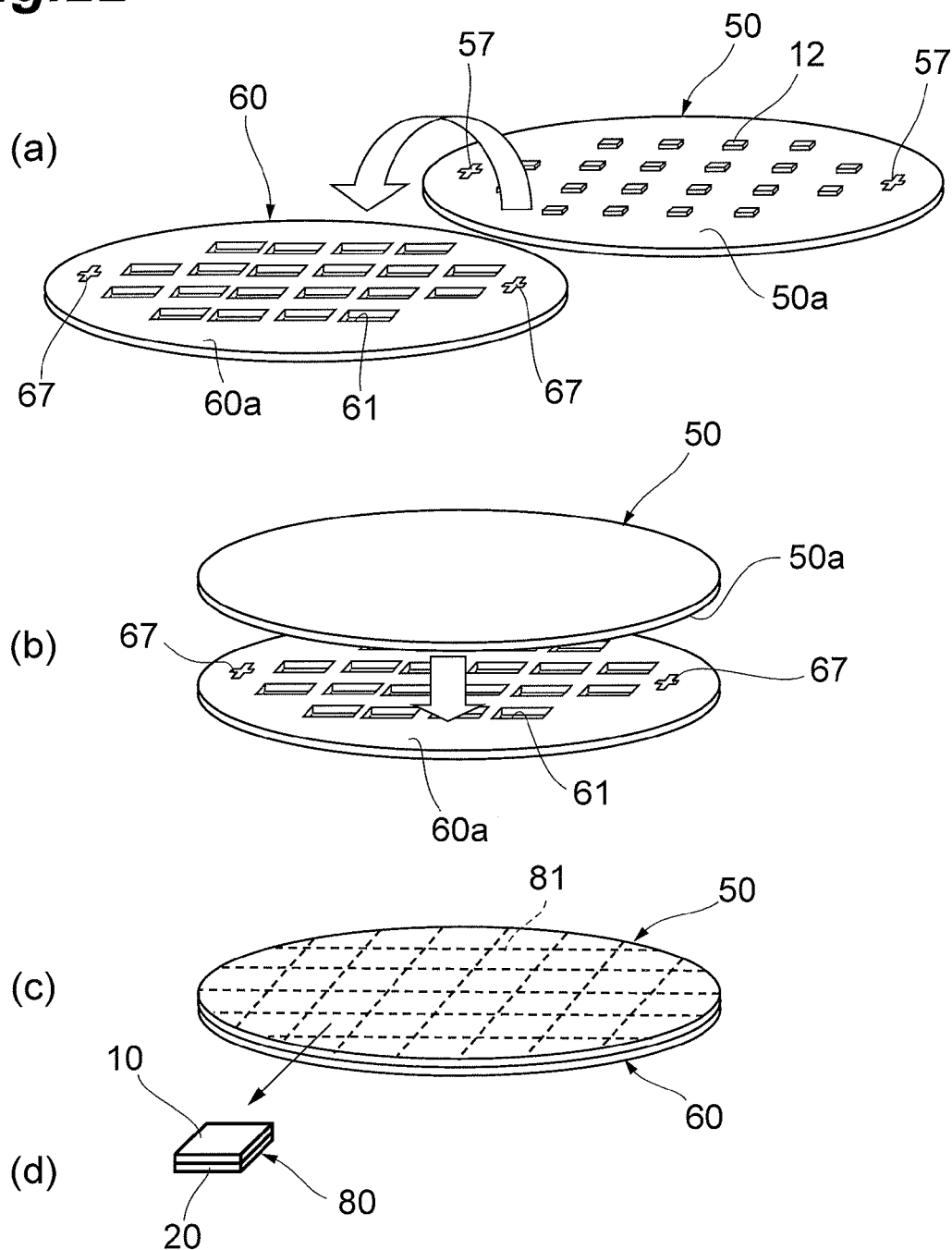
FIG. 22 includes diagrams for explanation of a first modified example.

FIG. 22 includes diagrams for explanation of a first modified example of the above-described embodiment. In the above-described embodiment, the alignment marks 17 and 27 are formed on the peripheral portions 10c and 20c of the plate-shaped members 10 and 20, meanwhile, as shown in (a) in FIG. 22, alignment marks 57 and 67 may be formed on the respective peripheral portions of wafers 50 and 60 used for preparing the plurality of plate-shaped members 10 and 20. In addition, the wafer 50 shown in (a) in FIG. 22 is the first wafer in the present modified example, and includes a plurality of regions respectively having the light transmissive optical components 12 formed by applying etching to a silicon region. Further, the wafer 60 is the second wafer in the present modified example, and includes a plurality of regions 61 having the light reflective optical components (the incident mirror 21, the fixed reflecting mirror 22, the movable reflecting mirror 23, and the exit mirror 24) on the side of its principal surface 60a.

In the present modified example, first, as shown in (a) in FIG. 22, the plurality of alignment marks 57 and 67 for alignment of the wafers 50 and 60 are formed on the respective peripheral portions of the wafers 50 and 60. Then, as shown in (b) in FIG. 22, a component forming surface 50a of the wafer 50 on which the light transmissive optical components 12 are formed, and a principal surface 60a of the wafer 60 are made to face one another such that the positions of the plurality of alignment marks 57 and 67 are matched to one another. In this state, the wafers 50 and 60 are bonded to one another ((c) in FIG. 22). Thereafter, the bonded wafers are cut along predetermined cutting lines 81, to cut out regions corresponding to the plate-shaped members 10 and 20 ((d) in FIG. 22), thereby preparing optical modules 80.

In the present modified example, because the alignment marks 57 and 67 are formed on the peripheral portions of the wafers 50 and 60, it is possible to make the distance between the plurality of alignment marks very long. Accordingly, even in the case where the accuracy of bonding (for example, approximately 10 μm) in flip-chip bonding does not change, it is possible to prominently reduce a relative angle deviation between the first plate-shaped member 10 and the second plate-shaped member 20. For example, in the case where the alignment marks 57 and 67 are prepared respectively with a space of 130 mm, an angle deviation becomes $\tan^{-1} (0.02/130)=0.009°$, which is almost a negliable level.

Second Modified Example

Figure 23:
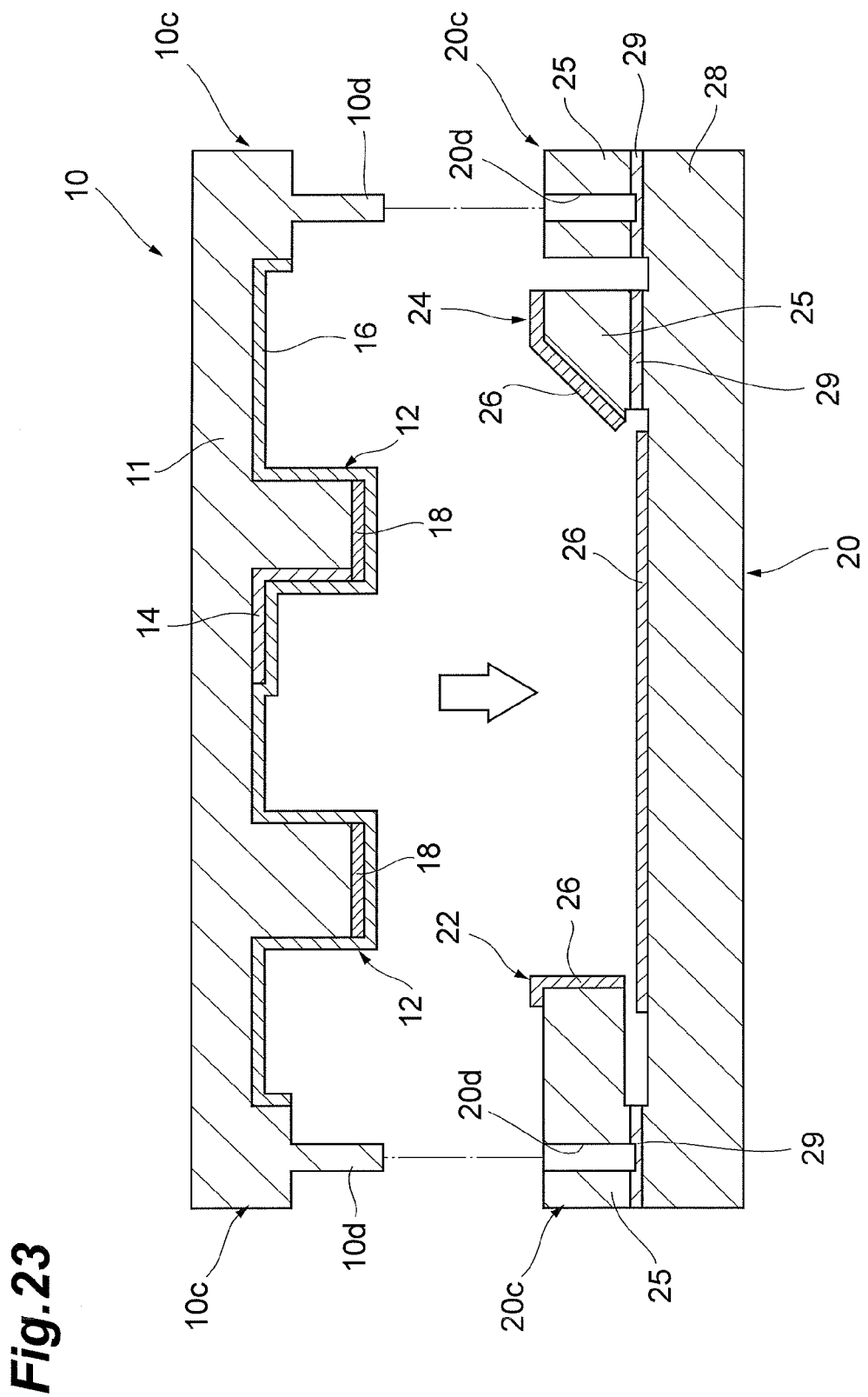
FIG. 23 is a diagram for explanation of a second modified example.

FIG. 23 is a diagram for explanation of a second modified example of the above-described embodiment. In the above-described embodiment, the first and second plate-shaped members 10 and 20 are aligned by use of the alignment marks 17 and 27, meanwhile, a method for alignment of the first and second plate-shaped members 10 and 20 is not limited thereto. For example, in the present modified example, a protrusion 10d is formed on the peripheral portion 10c of the first plate-shaped member 10, a depressed portion 20d is formed in the peripheral portion 20c of the second plate-shaped member 20, and the protrusion 10d is inserted into the depressed portion 20d, thereby aligning the first and second plate-shaped members 10 and 20.

The depressed portion 20d of the second plate-shaped member 20 is appropriately formed by simultaneously applying etching to the silicon layer 25 of the peripheral portion 20c in an etching process for forming the electrostatic actuator 30 and the respective mirrors 21 to 24. Further, the protrusion 10d of the first plate-shaped member 10 is appropriately formed by simultaneously applying etching to the silicon region 11 of the peripheral portion 10c in an etching process for forming the light transmissive optical component 12. In this way, it is possible to form the protrusion 10d and the depressed portion 20d by use of semiconductor processes, and it is possible to accurately form those.

Figure 24:
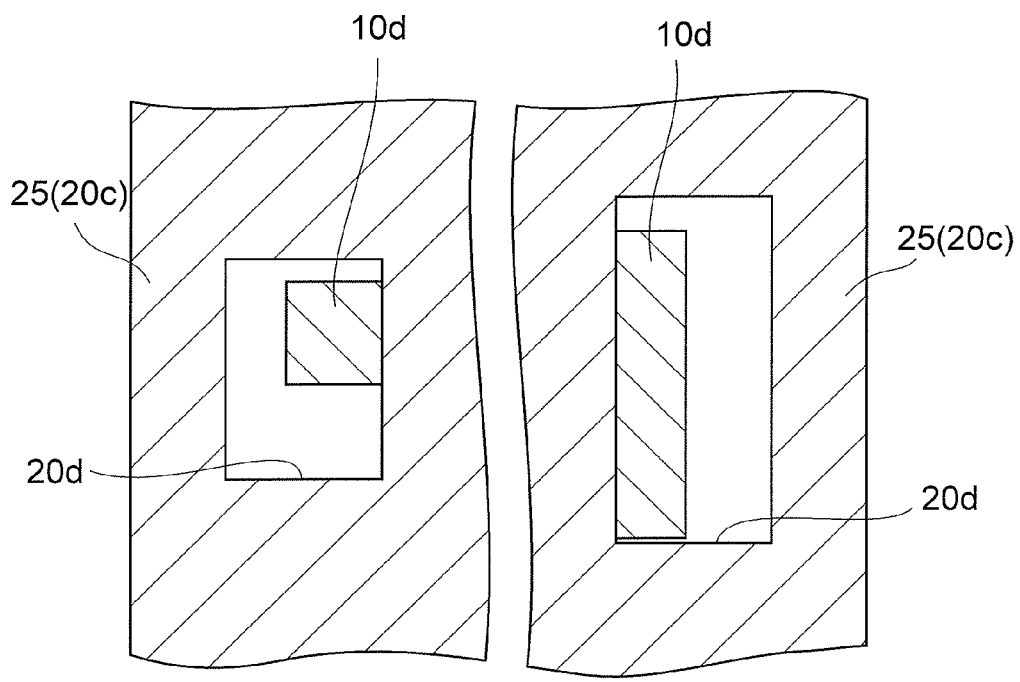
FIG. 24 is a cross-sectional view showing a positional relationship between a protrusion and a depressed portion, which is viewed from the thickness direction of the plate-shaped members in a state in which the protrusion is inserted into the depressed portion.

In addition, there is no need for the protrusion 10d to be fit into the depressed portion 20d with no space. FIG. 24 is a cross-sectional view showing a positional relationship between the protrusion 10d and the depressed portion 20d when viewed from the thickness direction of the plate-shaped members 10 and 20 in a state in which the protrusion 10d is inserted into the depressed portion 20d. As shown in FIG. 24, in the case where the planar dimension of the depressed portion 20d is greater than the planar dimension of the protrusion 10d, it is easy to insert the protrusion 10d, and further, when the contacting surfaces between the protrusion 10d and the depressed portion 20d are accurately formed, it is possible to sufficiently decrease an angle deviation between the plate-shaped members 10 and 20. In addition, in the configuration shown in FIG. 24, a positional deviation might be caused in a direction along the contacting surfaces between the protrusion 10d and the depressed portion 20d, meanwhile, as shown and described in (a) in FIG. 21, such a parallel deviation does not become a major issue. It is a matter of course that alignment may be more accurately carried out by matching the dimensions in that direction of the protrusion 10d and the depressed portion 20d. In addition, in the present modified example, after the protrusion 10d is inserted into the depressed portion 20d, the peripheral portions 10c and 20c are mounted with resin so as to be fixed to one another. Or, the optical module may be housed in a larger package, and the first plate-shaped member 10 and the second plate-shaped member 20 may be fixed so as not to be detached from one another.

Third Modified Example

In the above-described embodiment, the interference optical system including the electrostatic actuator 30 has been exemplified, meanwhile, in the present modified example, an example of an optical module which does not include a conductive member such as the electrostatic actuator 30 will be described. The optical module according to the present modified example produces an interfering light of a reflected light from a measuring target surface at an unknown distance. This interfering light is utilized for calculating a distance up to the measuring target surface.

Figure 25:
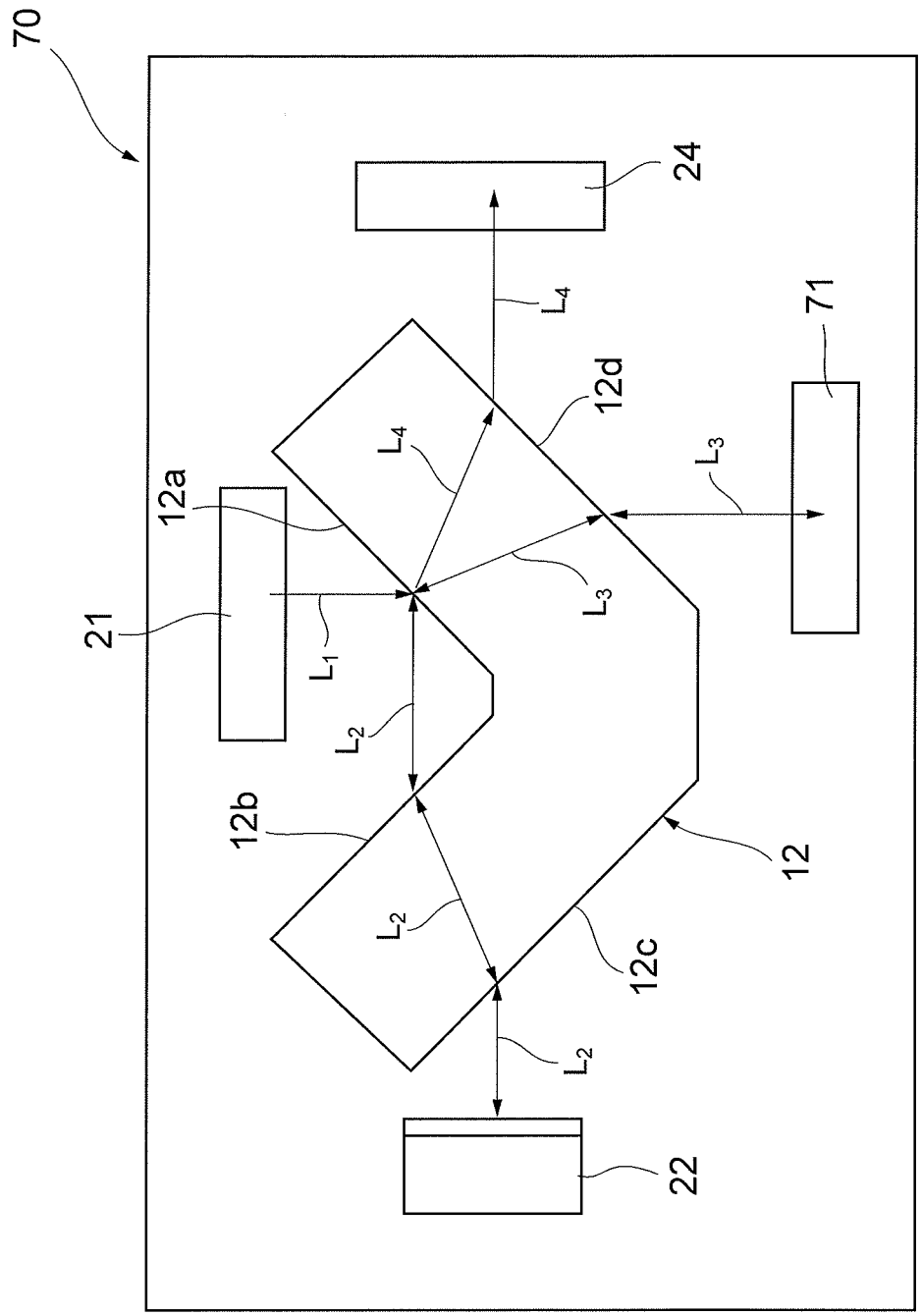
FIG. 25 is a plan view showing a configuration of the second plate-shaped member according to a third modified example.

FIG. 25 is a plan view showing a configuration of a second plate-shaped member 70 according to the present modified example. In the present modified example, in place of the movable reflecting mirror 23 in the above-described embodiment, an exit mirror 71 for projecting light onto a measuring target surface is formed on the second plate-shaped member 70. The exit mirror 71 has an inclined plane at an angle of 45° to the principal surface of the second plate-shaped member 70, and the metal film 26 is deposited on the inclined plane. This exit mirror 71 reflects the light $L_3$ reached from the semi-transmissive reflecting surface 12a toward the normal direction of the principal surface of the second plate-shaped member 70. The light $L_3$ reflected on the measuring target surface again returns to the exit mirror 71, and is reflected on the semi-transmissive reflecting surface 12a, to be taken out as interfering light $L_4$ from the exit mirror 24.

As in the present modified example, in the optical module without a conductive member as well, it is possible to appropriately obtain effects which are the same as the effects described in the above-described embodiment. That is, it is possible to dispose the light reflective optical components (the incident mirror 21, the fixed reflecting mirror 22, the exit mirror 71, and the exit mirror 24) and the light transmissive optical component 12 close to one another, and it is possible to satisfy the requirements even in the case where the requirements for the characteristics of the substrate are contradictory depending on the optical components.

The optical module and the manufacturing method for the optical module according to the present invention are not limited to the above-described embodiment and the respective modified examples, and in addition, various types of modifications are possible. For example, in the above-described embodiment and the respective modified examples, the Michelson interference optical system is exemplified as an optical module to which the present invention is applied, meanwhile, the present invention is applicable to, not only an interference optical system, but also various types of optical systems including a light transmissive optical component and a light reflective optical component.

The optical module according to the present embodiment is configured to include a first plate-shaped member having a light transmissive optical component which is formed by applying etching to a silicon region, and a second plate-shaped member having a light reflective optical component for reflecting light transmitting through the light transmissive optical component, on its principal surface, and the first and second plate-shaped members are bonded to one another such that a component forming surface of the first plate-shaped member on which the light transmissive optical component is formed and the principal surface of the second plate-shaped member face one another, and an optical path for light transmitting through the light transmissive optical component is along the component forming surface of the first plate-shaped member and the principal surface of the second plate-shaped member.

Further, the optical module may be configured such that the light reflective optical component has a surface formed by applying etching to a semiconductor region, and a metal film provided on the surface. In the case where the optical module has such a light reflective optical component, in a conventional optical module, it is necessary to dispose the light transmissive optical component at a region separated so as to prevent the metal from adhering thereto. Meanwhile, in accordance with the optical module according to the present embodiment, it is sufficient that the first plate-shaped member and the second plate-shaped member be bonded to one another after depositing a metal film on the second plate-shaped member, and therefore, it is possible to dispose the light reflective optical component and the light transmissive optical component close to one another so as for the metal not to adhere to the light transmissive optical component.

Further, the optical module may be configured such that the light reflective optical component has a surface formed by applying etching to a semiconductor region, and the semiconductor region is formed of silicon. With this configuration, it is possible to easily form the light reflective optical component.

Further, the optical module may be configured such that the light reflective optical component is separated from the principal surface, so as to be movable in a direction along the principal surface, and the second plate-shaped member further has an actuator structure that drives the light reflective optical component by electrostatic force. As mentioned above, in the optical module according to the present embodiment, it is possible to optimize the impurity concentration for each of the respective plate-shaped members. Accordingly, even in the case where the second plate-shaped member has an actuator structure, while appropriate amounts of impurities are added to the second plate-shaped member, which makes it possible to secure the conductivity, impurities are not added to the first plate-shaped member, which makes it possible to inhibit absorption of light in the light transmissive optical component.

Further, the optical module may be configured such that the light reflective optical component reflects light transmitting through the light transmissive optical component toward the first plate-shaped member, and the first plate-shaped member allows the light to transmit through it. Thereby, it is possible to appropriately output light (for example, an interfering light) transmitting through the light transmissive optical component, to the outside of the optical module.

Further, the optical module may be configured such that a specific resistance of the first plate-shaped member is higher than a specific resistance of the second plate-shaped member. In this case, because the impurity concentration of the first plate-shaped member is lower than the impurity concentration of the second plate-shaped member, it is possible to appropriately inhibit absorption of light in the light transmissive optical component.

Further, the optical module may be configured such that a peripheral portion of the first plate-shaped member and a peripheral portion of the second plate-shaped member are bonded to one another, and a plurality of alignment marks for alignment of the first and second plate-shaped members are formed on the respective peripheral portions of the first and second plate-shaped members. In this way, because the plurality of alignment marks are formed on the peripheral portions of the respective plate-shaped members, it is possible to reduce a relative angle deviation between the first plate-shaped member and the second plate-shaped member, which makes it possible to inhibit a lowering of the light use efficiency.

Further, the optical module may be configured such that the light transmissive optical component has a plurality of surfaces formed by applying etching to a silicon region, and an antireflection film is provided on at least one of the plurality of surfaces, and a semi-transmissive reflection film is provided on at least another of the plurality of surfaces. With this configuration, it is possible to appropriately realize a beam splitter as the light transmissive optical component.

A first manufacturing method for an optical module according to the above embodiment is configured to include forming a plurality of alignment marks for alignment of first and second plate-shaped members respectively on a peripheral portion of the first plate-shaped member having a light transmissive optical component formed by applying etching to a silicon region, and a peripheral portion of the second plate-shaped member having a light reflective optical component for reflecting light transmitting through the light transmissive optical component, on its principal surface, and bonding the peripheral portions of the first and second plate-shaped members to one another such that a component forming surface of the first plate-shaped member on which the light transmissive optical component is formed and the principal surface of the second plate-shaped member face one another, by use of the plurality of alignment marks.

A second manufacturing method for an optical module according to the above embodiment is configured to include forming a plurality of alignment marks for alignment of first and second wafers respectively on a peripheral portion of the first wafer including a plurality of regions which respectively have light transmissive optical components formed by applying etching to a silicon region, and a peripheral portion of the second wafer including a plurality of regions which have light reflective optical components for reflecting light transmitting through the light transmissive optical components, on its principal surface, and bonding the first and second wafers to one another such that a component forming surface of the first wafer on which the light transmissive optical components are formed and the principal surface of the second wafer face one another, by use of the plurality of alignment marks.

INDUSTRIAL APPLICABILITY

The present invention can be utilized as an optical module in which it is possible to dispose a light reflective optical component such as a mirror surface, and a light transmissive optical component such as a beam splitter close to one another, and it is possible to satisfy the requirements even in the case where the requirements for the characteristics of the substrate are contradictory depending on the optical components, and a manufacturing method for the optical module.

REFERENCE SIGNS LIST

10—first plate-shaped member, 10a—component forming surface, 10c—peripheral portion, 11—silicon region, 12—light transmissive optical component, 12a to 12d—side surface, 13—semi-transmissive reflection film, 14, 18—silicon oxide film, 16—silicon nitride film, 17, 27—alignment mark, 19—silicon nitride film, 20—second plate-shaped member, 20a—principal surface, 20c—peripheral portion, 21—incident mirror, 22—fixed reflecting mirror, 23—movable reflecting mirror, 24—exit mirror, 25—silicon layer, 26—metal film, 28—support substrate, 29—insulating layer, 30—electrostatic actuator, 50, 60—wafer, 57, 67—alignment mark, $L_1$ to $L_3$—measurement object light, $L_4$—interfering light image.

The invention claimed is:

1. An optical module comprising:
a first plate-shaped member having a silicon region, a component forming surface, and a light transmissive optical component for transmitting light, the light transmissive optical component being formed on the component forming surface by applying etching to the silicon region; and
a second plate-shaped member having a semiconductor region, a principal surface, and a light reflective optical component for reflecting the light transmitting through the light transmissive optical component, wherein the light reflective optical component has a surface formed by applying etching to the semiconductor region, the light reflective optical component being formed on the principal surface, wherein an impurity concentration of the silicon region in the first plate-shaped member is lower than an impurity concentration of the semiconductor region in the second plate-shaped member,
the first and second plate-shaped members are bonded to one another such that the component forming surface of the first plate-shaped member on which the light transmissive optical component is formed and the principal surface of the second plate-shaped member face one another, and
an optical path for the light transmitting through the light transmissive optical component between the light transmissive optical component and the light reflective optical component is along the component forming surface of the first plate-shaped member and the principal surface of the second plate-shaped member.

2. The optical module according to claim 1, wherein the light reflective optical component has a metal film provided on the surface.

3. The optical module according to claim 1, wherein the semiconductor region is formed of silicon.

4. The optical module according to claim 1, wherein the light reflective optical component is separated from the principal surface, so as to be movable in a direction along the principal surface, and
the second plate-shaped member further has an actuator structure that drives the light reflective optical component by electrostatic force.

5. The optical module according to claim 1, wherein the light reflective optical component reflects light transmitting through the light transmissive optical component toward the first plate-shaped member, and the first plate-shaped member allows the light to transmit through it.

6. The optical module according to claim 1, wherein a specific resistance of the first plate-shaped member is higher than a specific resistance of the second plate-shaped member.

7. The optical module according to claim 1, wherein a peripheral portion of the first plate-shaped member and a peripheral portion of the second plate-shaped member are bonded to one another, and
a plurality of alignment marks for alignment of the first and second plate-shaped members are formed on the respective peripheral portions of the first and second plate-shaped members.

8. The optical module according to claim 1, wherein the light transmissive optical component has a plurality of surfaces formed by applying etching to the silicon region, and
an antireflection film is provided on at least one of the plurality of surfaces, and
a semi-transmissive reflection film is provided on at least another of the plurality of surfaces.

9. The optical module according to claim 1, wherein impurities are not added to the silicon region of the first plate-shaped member, and impurities are added to the semiconductor region of the second plate-shaped member.

* * * * *